US011553435B2

(12) United States Patent
Hu et al.

(10) Patent No.: US 11,553,435 B2
(45) Date of Patent: Jan. 10, 2023

(54) UPLINK INFORMATION TRANSMISSION METHOD AND APPARATUS

(71) Applicant: Huawei Technologies Co., Ltd., Shenzhen (CN)

(72) Inventors: Dan Hu, Beijing (CN); Yongxia Lyu, Shenzhen (CN); Ruixiang Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/925,432

(22) Filed: Jul. 10, 2020

(65) Prior Publication Data

US 2020/0344699 A1 Oct. 29, 2020

Related U.S. Application Data

(63) Continuation of application No. PCT/CN2019/070732, filed on Jan. 8, 2019.

(30) Foreign Application Priority Data

Jan. 11, 2018 (CN) .......................... 201810026375.3

(51) Int. Cl.
*H04W 52/14* (2009.01)
*H04W 52/24* (2009.01)
*H04W 72/04* (2009.01)

(52) U.S. Cl.
CPC ....... *H04W 52/146* (2013.01); *H04W 52/241* (2013.01); *H04W 52/242* (2013.01); *H04W 72/042* (2013.01)

(58) Field of Classification Search
CPC ........... H04W 52/00–60; H04W 48/12; H04W 52/146; H04W 52/241; H04W 52/242; H04W 72/042
See application file for complete search history.

(56) References Cited

U.S. PATENT DOCUMENTS

2014/0092832 A1* 4/2014 Han ...................... H04L 1/0073
370/329
2015/0085716 A1 3/2015 Zhang et al.
(Continued)

FOREIGN PATENT DOCUMENTS

CN 101729104 A 6/2010
CN 101877906 A 11/2010
(Continued)

OTHER PUBLICATIONS

3GPP TS 38.213 V15.0.0 (Dec. 2017), "3rd Generation Partnership Project; Technical Specification Group Radio Access Network; NR; Physical layer procedures for control (Release 15)," 56 pages.
(Continued)

*Primary Examiner* — Raymond S Dean
(74) *Attorney, Agent, or Firm* — Slater Matsil, LLP

(57) ABSTRACT

This application provides an uplink information transmission method and apparatus. The method includes: determining a value of a power control parameter in a value set of the power control parameter, where any value set of the power control parameter includes at least two values; sending indication information to a terminal device, where the indication information is used to indicate the value of the power control parameter; and receiving uplink information, where the uplink information is from the terminal device at a transmit power adjusted based on the value of the power control parameter.

18 Claims, 7 Drawing Sheets

(56) References Cited

U.S. PATENT DOCUMENTS

| | | | |
|---|---|---|---|
| 2015/0223174 A1 | 8/2015 | Larsson et al. | |
| 2015/0223213 A1* | 8/2015 | Moon | H04W 52/40 370/329 |
| 2015/0282092 A1* | 10/2015 | Nakamura | H04W 16/32 455/522 |
| 2015/0312074 A1 | 10/2015 | Zhu et al. | |
| 2018/0103428 A1* | 4/2018 | Jiang | H04W 72/042 |
| 2019/0068346 A1* | 2/2019 | Akkarakaran | H04W 72/042 |
| 2019/0074882 A1* | 3/2019 | Zhou | H04W 72/046 |
| 2019/0141711 A1* | 5/2019 | Fu | H04L 5/0092 |
| 2019/0373559 A1* | 12/2019 | Davydov | H04W 52/42 |
| 2020/0059935 A1* | 2/2020 | Qian | H04W 72/042 |

FOREIGN PATENT DOCUMENTS

| | | |
|---|---|---|
| CN | 101998504 A | 3/2011 |
| CN | 102291812 A | 12/2011 |
| CN | 102404854 A | 4/2012 |
| CN | 103369654 A | 10/2013 |
| CN | 103391607 A | 11/2013 |
| CN | 104081681 A | 10/2014 |
| CN | 104509180 A | 4/2015 |
| CN | 105723781 A | 6/2016 |
| CN | 107197512 A | 9/2017 |
| CN | 107294665 A | 10/2017 |
| WO | 2013165286 A1 | 11/2013 |
| WO | 2017194012 A1 | 11/2017 |

OTHER PUBLICATIONS

Huawei, HiSilicon, "Discussion on UCI feedback for URLLC," 3GPP TSG RAN WG1 Ad Hoc Meeting, Vancouver, Canada, Jan. 22-26, 2018, R1-1800054, 14 pages.

Huawei, HiSilicon, "PUCCH reliability," 3GPP TSG RAN WG1 Meeting #92bis, Sanya, China, Apr. 16-20, 2018, R1-1804291, 4 pages.

Huawei, HiSilicon, "PUSCH reliability for URLLC," 3GPP TSG RAN WG1 Meeting #93, Busan, Korea, May 21-25, 2018, R1-1806902, 5 pages.

Huawei, HiSilicon, "UL multiplexing between URLLC and eMBB," 3GPP TSG RAN WG1 Meeting #92bis, Sanya, China, Apr. 16-20, 2018, R1-1803659, 8 pages.

3rd Generation Partnership Project,Technical Specification Group Radio Access Network, NR, Physical channels and modulation (Release 15), 3GPP TS 38.211 V15.0.0 (Dec. 2017), 73 pages.

3rd Generation Partnership Project,Technical Specification Group Radio Access Network, NR, Multiplexing and channel coding (Release 15), 3GPP TS 38.212 V15.0.0 (Dec. 2017), 82 pages.

3rd Generation Partnership Project,Technical Specification Group Radio Access Network, NR, Physical layer procedures for data (Release 15), 3GPP TS 38.214 V15.0.0 (Dec. 2017), 71 pages.

3rd Generation Partnership Project,Technical Specification Group Radio Access Network, NR, Physical layer measurements (Release 15), 3GPP TS 38.215 V15.0.0 (Dec. 2017), 13 pages.

3rd Generation Partnership Project,Technical Specification Group Radio Access Network, NR, Medium Access Control (MAC) protocol specification (Release 15), 3GPP TS 38.321 V15.0.0 (Dec. 2017), 55 pages.

3rd Generation Partnership Project,Technical Specification Group Radio Access Network, NR, Radio Resource Control (RRC) protocol specification (Release 15), 3GPP TS 38.331 V15.0.0 (Dec. 2017), 188 pages.

3rd Generation Partnership Project,Technical Specification Group Radio Access Network, NR, User Equipment (UE) radio transmission and reception, Part 1: Range 1 Standalone (Release 15), 3GPP TS 38.101-1 V15.0.0 (Dec. 2017), 49 pages.

Zte et al., "Offline summary for AI 6.7 NR UL power control", 3GPP TSG RAN WG1 Meeting NR#3, R1-1716761, Nagoya, Japan, Sep. 18-21, 2017, 9 pages.

3GPP, Evolved Universal Terrestrial Radio Access (E-UTRA), Physical layer procedures, 3GPP TS 36.213, version 14.5.0 Release 14, Jan. 2018, 42 pages.

Zte et al.,. "Offline summary of UL power control- non-CA aspects", 3GPP TSG RAN WG1 Meeting #91, R1-1721676, Nov. 27-Dec. 1, 2017, 65 Pages, Reno, USA.

* cited by examiner

UPLINK INFORMATION TRANSMISSION METHOD AND APPARATUS

CROSS-REFERENCE TO RELATED APPLICATIONS

This application is a continuation of International Application No. PCT/CN2019/070732, filed on Jan. 8, 2019, which claims priority to Chinese Patent Application No. 201810026375.3, filed on Jan. 11, 2018. The disclosures of the aforementioned applications are hereby incorporated by reference in their entireties.

TECHNICAL FIELD

Embodiments of this application relate to the field of communications technologies, and in particular, to an uplink information transmission method and apparatus.

BACKGROUND

To cope with explosive growth of mobile data traffic, massive mobile communications device connections, and various emerging services and application scenarios in the future, a fifth generation (5G) mobile communications system emerges. The international telecommunication union (ITU) defines three types of application scenarios for 5G and a future mobile communications system: enhanced mobile broadband (eMBB), ultra-reliable low-latency communication (URLLC), and massive machine-type communications (mMTC).

Because an eMBB service and a URLLC service have different reliability requirements, reliability changes from 90% for the eMBB service to 99.999% for the URLLC service, a corresponding block error rate (BLER) changes from $10^{-1}$ for the eMBB service to $10^{-5}$ for the URLLC service, and a maximum change range of a corresponding signal-to-noise ratio (SNR), namely, a maximum operating point change range can reach 5 dB to 10 dB. However, a current adjustment value of a transmit power control (TPC) command field (TPC control command field) does not meet a requirement for an operating point change from the eMBB service to the URLLC service.

SUMMARY

Embodiments of this application provide an uplink information transmission method and apparatus, to meet a requirement on an operating point change from an eMBB service to a URLLC service.

A first aspect of this application provides an uplink information receiving method, including: determining a value of a power control parameter in a value set of the power control parameter, where any value set of the power control parameter includes at least two values; sending indication information to a terminal device, where the indication information is used to indicate the value of the power control parameter; and receiving uplink information, where the uplink information is sent by the terminal device at a transmit power adjusted based on the value of the power control parameter.

In this solution, reliability changes from 90% for an eMBB service to 99.999% for a URLLC service, a corresponding BLER changes from $10^{-1}$ for the eMBB service to $10^{-5}$ for the URLLC service, and a maximum corresponding operating point change range can reach 5 dB to 10 dB. To meet a requirement on an operating point change, a network device may determine the value of the power control parameter in the value set including the at least two values, and indicate the determined value of the power control parameter to the terminal device, so that the terminal device adjusts the transmit power for the uplink information based on the determined value of the power control parameter. In this way, the network device may select different values of the power control parameter based on different reliability of transmission services, to further meet requirements of the services with the different reliability, so that a requirement on an operating point change corresponding to the transmission services with the different reliability can be met.

In the foregoing solution, the network device determines the value of the power control parameter in the value set of the power control parameter, where any value set of the power control parameter includes at least two values; then sends the indication information to the terminal device, where the indication information is used to indicate the value of the power control parameter; and receives the uplink information, where the uplink information is sent by the terminal device at the transmit power adjusted based on the value of the power control parameter. The network device may determine the value of the power control parameter in the value set including the at least two values, and indicate the determined value of the power control parameter to the terminal device, so that the terminal device adjusts the transmit power for the uplink information based on the determined value of the power control parameter. In this way, the network device may select different values of the power control parameter based on different reliability of transmission services, to further meet requirements of the services with the different reliability, so that a requirement on an operating point change corresponding to the transmission services with the different reliability can be met.

Optionally, the power control parameter includes at least one of an accumulated power correction value, an absolute power correction value, and a first parameter, and the first parameter includes at least one of the following information: a path loss compensation factor; a target signal-to-noise ratio that is used when the network device receives data from the terminal device; and a power scaling factor.

In this solution, the terminal device may adjust the transmit power by adjusting a value of the at least one of the accumulated power correction value, the absolute power correction value, and the first parameter.

Optionally, the power control parameter includes the accumulated power correction value, and a maximum value of the accumulated power correction value is 5, 6, 7, or 10.

Optionally, the power control parameter includes the accumulated power correction value, and a minimum value of the accumulated power correction value is −3, −5, or −6.

Optionally, the power control parameter includes the absolute power correction value, and a maximum value of the absolute power correction value is 8, 9, 12, or 16.

Optionally, the power control parameter includes the absolute power correction value, and a minimum value of the absolute power correction value is −8, −9, −12, or −16.

Optionally, the power control parameter includes the accumulated power correction value, and the accumulated power correction value is −2, 0, 2, or 5; or the accumulated power correction value is −2, 0, 2, or 6.

Optionally, the power control parameter includes the absolute power correction value, and the absolute power correction value is −7, −2, 2, or 7; or the absolute power correction value is −6, −1, 1, or 6; or the absolute power correction value is −8, −2, 2, or 8.

In the foregoing solutions, an adjustment range of the absolute power correction value and an adjustment range of the accumulated power correction value are expanded. In this way, requirements of services with different reliability can be met, so that a requirement on an operating point change corresponding to the transmission services with the different reliability can be met.

Optionally, the power control parameter includes the accumulated power correction value and/or the absolute power correction value, and a value set of the accumulated power correction value and/or a value set of the absolute power correction value are/is configured by using higher layer signaling.

In this solution, the higher layer signaling may be, for example, radio resource control (radio resource control, RRC) signaling. Because the value set of the accumulated power correction value and/or the value set of the absolute power correction value may be configured by using the higher layer signaling, the value set of the accumulated power correction value and/or the value set of the absolute power correction value may be configured more flexibly.

Optionally, the indication information is carried in downlink control information DCI.

Optionally, the indication information is carried in a first field in the DCI, and the first field is a DCI header, a modulation and coding scheme MCS, or a power control adjustment state variable of a physical uplink shared channel PUSCH.

Optionally, the DCI includes terminal-specific DCI or group user common DCI.

In the foregoing solution, the indication information may be carried in the DCI, to be specific, the value of the power control parameter may be indicated by using a field in the DCI. Specifically, the value of the power control parameter may be explicitly indicated by configuring a new field of at least one bit in the DCI, or the value of the power control parameter may be implicitly indicated by reusing an original field in the DCI.

Optionally, before the sending indication information to a terminal device, the method further includes: sending downlink control information DCI or higher layer signaling to the terminal, where the DCI or the higher layer signaling is used to indicate that the value of the power control parameter is the accumulated power correction value or the absolute power correction value.

In this solution, the network device determines that the power control parameter includes the accumulated power correction value or the absolute power correction value, and the network device sends the downlink control information (DCI) or the higher layer signaling to the terminal device. The DCI or the higher layer signaling is used to indicate whether the value of the power control parameter is the accumulated power correction value or the absolute power correction value. The higher layer signaling may be, for example, an RRC message.

In the foregoing solution, the network device sends the DCI or the higher layer signaling to the terminal device, to indicate that the value of the power control parameter is the accumulated power correction value or the absolute power correction value, so that the terminal device can correctly adjust the transmit power by using the value of the power control parameter, thereby improving accuracy of transmit power adjustment.

Optionally, when a service type is URLLC, the DCI or the higher layer signaling is used to indicate that the value of the power control parameter is the absolute power correction value.

In this solution, the absolute power correction value is used for only one time of power adjustment, and the accumulated power correction value may be iterated based on one or more previous closed-loop power control adjustment states. When a data volume of uplink transmission data transmitted by the terminal device is less than a preset threshold, for example, when the URLLC service is transmitted, due to the relatively small data volume, usually only one time of power adjustment may be required to meet the requirement. Therefore, when adjusting the transmit power, the terminal device may use only the absolute power correction value instead of the accumulated power correction value.

Optionally, the uplink information includes a physical uplink shared channel PUSCH, a physical uplink control channel PUCCH, or a sounding reference signal SRS.

A second aspect of this application provides an uplink information sending method, including: receiving indication information from a network device, where the indication information is used to indicate a value of a power control parameter, the value of the power control parameter is determined by the network device in a value set of the power control parameter, and any value set of the power control parameter includes at least two values; adjusting a transmit power based on the value of the power control parameter; and sending uplink information at an adjusted transmit power.

In this solution, reliability changes from 90% for an eMBB service to 99.999% for a URLLC service, a corresponding BLER changes from $10^{-1}$ for the eMBB service to $10^{-5}$ for the URLLC service, and a maximum corresponding operating point change range can reach 5 dB to 10 dB. To meet a requirement on an operating point change, the network device may determine the value of the power control parameter in the value set including the at least two values, and indicate the determined value of the power control parameter to a terminal device, so that the terminal device adjusts the transmit power for the uplink information based on the determined value of the power control parameter. In this way, the network device may select different values of the power control parameter based on different reliability of transmission services, to further meet requirements of the services with the different reliability, so that a requirement on an operating point change corresponding to the transmission services with the different reliability can be met.

In the foregoing solution, the network device determines the value of the power control parameter in the value set of the power control parameter, where any value set of the power control parameter includes at least two values; then sends the indication information to the terminal device, where the indication information is used to indicate the value of the power control parameter; and receives the uplink information, where the uplink information is sent by the terminal device at the transmit power adjusted based on the value of the power control parameter. The network device may determine the value of the power control parameter in the value set including the at least two values, and indicate the determined value of the power control parameter to the terminal device, so that the terminal device adjusts the transmit power for the uplink information based on the determined value of the power control parameter. In this way, the network device may select different values of the power control parameter based on different reliability of transmission services, to further meet requirements of the services with the different reliability, so that a requirement on an operating point change corresponding to the transmission services with the different reliability can be met.

Optionally, the power control parameter includes at least one of an accumulated power correction value, an absolute power correction value, and a first parameter, and the first parameter includes at least one of the following information: a path loss compensation factor; a target signal-to-noise ratio that is used when the network device receives data from the terminal device; and a power scaling factor.

In this solution, the terminal device may adjust the transmit power by adjusting a value of the at least one of the accumulated power correction value, the absolute power correction value, and the first parameter.

Optionally, the power control parameter includes the accumulated power correction value, and a maximum value of the accumulated power correction value is 5, 6, 7, or 10.

Optionally, the power control parameter includes the accumulated power correction value, and a minimum value of the accumulated power correction value is −3, −5, or −6.

Optionally, the power control parameter includes the absolute power correction value, and a maximum value of the absolute power correction value is 8, 9, 12, or 16.

Optionally, the power control parameter includes the absolute power correction value, and a minimum value of the absolute power correction value is −8, −9, −12, or −16.

Optionally, the power control parameter includes the accumulated power correction value, and the accumulated power correction value is −2, 0, 2, or 5; or the accumulated power correction value is −2, 0, 2, or 6.

Optionally, the power control parameter includes the absolute power correction value, and the absolute power correction value is −7, −2, 2, or 7; or the absolute power correction value is −6, −1, 1, or 6; or the absolute power correction value is −8, −2, 2, or 8.

In the foregoing solutions, an adjustment range of the absolute power correction value and an adjustment range of the accumulated power correction value are expanded. In this way, requirements of services with different reliability can be met, so that a requirement on an operating point change corresponding to the transmission services with the different reliability can be met.

Optionally, the power control parameter includes the accumulated power correction value and/or the absolute power correction value, and a value set of the accumulated power correction value and/or a value set of the absolute power correction value are/is configured by using higher layer signaling.

In this solution, the higher layer signaling may be, for example, radio resource control (RRC) signaling. Because the value set of the accumulated power correction value and/or the value set of the absolute power correction value may be configured by using the higher layer signaling, the value set of the accumulated power correction value and/or the value set of the absolute power correction value may be configured more flexibly.

Optionally, the indication information is carried in downlink control information DCI.

Optionally, the indication information is carried in a first field in the DCI, and the first field is a DCI header, a modulation and coding scheme MCS, or a power control adjustment state variable of a physical uplink shared channel PUSCH.

Optionally, the DCI includes terminal-specific DCI or group user common DCI.

In the foregoing solution, the indication information may be carried in the DCI, to be specific, the value of the power control parameter may be indicated by using a field in the DCI. Specifically, the value of the power control parameter may be explicitly indicated by configuring a new field of at least one bit in the DCI, or the value of the power control parameter may be implicitly indicated by reusing an original field in the DCI.

Optionally, before the receiving indication information from a network device, the method further includes: receiving downlink control information DCI or higher layer signaling from the network device, where the DCI or the higher layer signaling is used to indicate that the value of the power control parameter is the accumulated power correction value or the absolute power correction value.

In this solution, when the power control parameter determined by the network device includes the accumulated power correction value or the absolute power correction value, the network device sends the downlink control information (downlink control information, DCI) or the higher layer signaling to the terminal device. The DCI or the higher layer signaling is used to indicate whether the value of the power control parameter is the accumulated power correction value or the absolute power correction value. The higher layer signaling may be, for example, an RRC message.

In the foregoing solution, the network device sends the DCI or the higher layer signaling to the terminal device, to indicate that the value of the power control parameter is the accumulated power correction value or the absolute power correction value, so that the terminal device can correctly adjust the transmit power by using the value of the power control parameter, thereby improving accuracy of transmit power adjustment.

Optionally, when a service type is URLLC, the DCI or the higher layer signaling is used to indicate that the value of the power control parameter is the absolute power correction value.

In this solution, the absolute power correction value is used for only one time of power adjustment, and the accumulated power correction value may be iterated based on one or more previous closed-loop power control adjustment states. When a data volume of uplink transmission data transmitted by the terminal device is less than a preset threshold, for example, when the URLLC service is transmitted, due to the relatively small data volume, usually only one time of power adjustment may be required to meet the requirement. Therefore, when adjusting the transmit power, the terminal device may use only the absolute power correction value instead of the accumulated power correction value.

Optionally, the uplink information includes a physical uplink shared channel PUSCH, a physical uplink control channel PUCCH, or a sounding reference signal SRS.

A third aspect of this application provides an uplink information sending method, including: receiving indication information from a network device, where the indication information is used to indicate a second parameter, the second parameter includes an accumulated power correction value or an absolute power correction value, and the indication information is carried in downlink control information DCI; adjusting a transmit power based on the second parameter; and sending uplink information at an adjusted transmit power.

In this solution, a terminal device receives the indication information from the network device, where the indication information is used to indicate the second parameter, the second parameter includes the accumulated power correction value or the absolute power correction value, and the indication information is carried in the downlink control information DCI; adjusts the transmit power based on the second parameter; and then sends the uplink information at the adjusted transmit power. The network device indicates the second parameter to the terminal device, so that the terminal device adjusts the transmit power for the uplink information based on the indicated second parameter. In this way, the transmit power adjusted by the terminal device may meet requirements of services with different reliability, so that a requirement on an operating point change corresponding to the transmission services with the different reliability can be met.

Optionally, before the adjusting a transmit power based on the second parameter, the method further includes: determining power control identification information, where the power control identification information is used to identify a first parameter, and the first parameter includes a path loss compensation factor and/or a target signal-to-noise ratio that is used when the network device receives data from the terminal device; and the adjusting a transmit power based on the second parameter includes: adjusting the transmit power based on the second parameter and the first parameter.

In a possible implementation, after adjusting the transmit power based on the accumulated power correction value or the absolute power correction value, if the terminal device finds that the adjusted transmit power does not meet a requirement for sending the uplink information, the terminal device further determines the power control identification information. The power control identification information is used to identify the first parameter. The terminal device adjusts the transmit power based on the second parameter and the first parameter together. The first parameter includes the path loss compensation factor and/or the target signal-to-noise ratio that is used when the network device receives the data from the terminal device.

In the foregoing solution, the terminal device may adjust the transmit power based on the second parameter and the first parameter together, so that the adjusted transmit power can meet the requirement on the operating point change corresponding to the transmission services.

Optionally, when the DCI is fallback DCI, the power control identification information is first power control identification information, and the first power control identification information is used to identify a first path loss compensation factor and/or a first target signal-to-noise ratio that is used when the network device receives data from the terminal device; or when the DCI is non-fallback DCI, the power control identification information is second power control identification information, and the second power control identification information is used to identify a second path loss compensation factor and/or a second target signal-to-noise ratio that is used when the network device receives data from the terminal device, where the first power control identification information is different from the second power control identification information.

In this solution, when the DCI is the fallback DCI, the first path loss compensation factor and/or the first target signal-to-noise ratio that is used when the network device receives the data from the terminal device that correspond/corresponds to the power control identification information being 0 are/is indicated; or when the DCI is the non-fallback DCI, the second path loss compensation factor and/or the second target signal-to-noise ratio that is used when the network device receives the data from the terminal device that correspond/corresponds to the power control identification information not being 0 are/is indicated.

Optionally, the first path loss compensation factor and the second path loss compensation factor are independently configured; or the first target signal-to-noise ratio and the second target signal-to-noise ratio are independently configured.

In this solution, when the DCI is separately the fallback DCI and the non-fallback DCI, the first path loss compensation factor and/or the first target signal-to-noise ratio that is used when the network device receives the data from the terminal device that are/is indicated by the first power control identification information, and the second path loss compensation factor and/or the second target signal-to-noise ratio that is used when the network device receives the data from the terminal device that are/is indicated by the second power control identification information have no relationship, to be specific, are independently configured.

Optionally, when the DCI is the fallback DCI, the terminal device is in a non-radio resource control RRC connected mode or an RRC connected mode; or when the DCI is the non-fallback DCI, the terminal device is in an RRC connected mode.

In this solution, when the DCI is the fallback DCI, the terminal device may be in the non-RRC connected mode, or may be in the RRC connected mode. In other words, when the terminal device is switched from the non-RRC connected mode to the RRC connected mode, the terminal device may receive the fallback DCI from the network device. When the DCI is the non-fallback DCI, the terminal device can be only in the RRC connected mode.

A fourth aspect of this application provides an uplink information receiving method, including: sending indication information to a terminal device, where the indication information is used to indicate a second parameter, the second parameter includes an accumulated power correction value or an absolute power correction value, and the indication information is carried in downlink control information DCI; and receiving uplink information from the terminal device, where the uplink information is sent by the terminal device at a transmit power adjusted based on the second parameter.

In this solution, the terminal device receives the indication information from a network device, where the indication information is used to indicate the second parameter, the second parameter includes the accumulated power correction value or the absolute power correction value, and the indication information is carried in the downlink control information DCI; adjusts the transmit power based on the second parameter; and then sends the uplink information at an adjusted transmit power. The network device indicates the second parameter to the terminal device, so that the terminal device adjusts the transmit power for the uplink information based on the indicated second parameter. In this way, the transmit power adjusted by the terminal device may meet requirements of services with different reliability, so that a requirement on an operating point change corresponding to the transmission services with the different reliability can be met.

Optionally, the uplink information is sent by the terminal device at a transmit power adjusted based on the second parameter and a first parameter, the first parameter is identified by using power control identification information determined by the terminal device, and the first parameter includes a path loss compensation factor and/or a target signal-to-noise ratio that is used when the network device receives data from the terminal device.

Optionally, when the DCI is fallback DCI, the power control identification information is first power control identification information, and the first power control identification information is used to identify a first path loss compensation factor and/or a first target signal-to-noise ratio that is used when the network device receives data from the terminal device; or when the DCI is non-fallback DCI, the power control identification information is second power control identification information, and the second power control identification information is used to identify a second path loss compensation factor and/or a second target signal-to-noise ratio that is used when the network device receives data from the terminal device, where the first power control identification information is different from the second power control identification information.

In this solution, when the DCI is the fallback DCI, the first path loss compensation factor and/or the first target signal-to-noise ratio that is used when the network device receives the data from the terminal device that correspond/corresponds to the power control identification information being 0 are/is indicated; or when the DCI is the non-fallback DCI, the second path loss compensation factor and/or the second target signal-to-noise ratio that is used when the network device receives the data from the terminal device that correspond/corresponds to the power control identification information not being 0 are/is indicated.

Optionally, the first path loss compensation factor and the second path loss compensation factor are independently configured; or the first target signal-to-noise ratio and the second target signal-to-noise ratio are independently configured.

In this solution, when the DCI is separately the fallback DCI and the non-fallback DCI, the first path loss compensation factor and/or the first target signal-to-noise ratio that is used when the network device receives the data from the terminal device that are/is indicated by the first power control identification information, and the second path loss compensation factor and/or the second target signal-to-noise ratio that is used when the network device receives the data from the terminal device that are/is indicated by the second power control identification information have no relationship, to be specific, are independently configured.

Optionally, when the DCI is the fallback DCI, the terminal device is in a non-radio resource control RRC connected mode or an RRC connected mode; or when the DCI is the non-fallback DCI, the terminal device is in an RRC connected mode.

In this solution, when the DCI is the fallback DCI, the terminal device may be in the non-RRC connected mode, or may be in the RRC connected mode. To be specific, when the terminal device is switched from the non-RRC connected mode to the RRC connected mode, the terminal device may receive the fallback DCI from the network device. When the DCI is the non-fallback DCI, the terminal device can be only in the RRC connected mode.

A fifth aspect of this application provides an uplink information transmission method, including: receiving, by a terminal device, indication information and resource allocation information that are from a network device; if the resource allocation information indicates a first resource area, determining, by the terminal device, a first value of a power control parameter in a first value set of the power control parameter based on the indication information; or if the resource allocation information indicates a second resource area, determining, by the terminal device, a second value of a power control parameter in a second value set of the power control parameter based on the indication information; adjusting, by the terminal device, a transmit power based on the first value or the second value; and sending, by the terminal device, uplink information based on an adjusted transmit power.

A sixth aspect of this application provides an uplink information transmission method, including: sending, by a network device, indication information and resource allocation information to a terminal device; and receiving, by the network device, uplink information from the terminal device, where the uplink information is sent by the terminal device at a transmit power adjusted based on a first value and a second value, the first value is a value of a power control parameter that is determined by the terminal device in a first value set of the power control parameter based on the indication information when the resource allocation information indicates a first resource area, and the second value is a value of a power control parameter that is determined by the terminal device in a second value set of the power control parameter based on the indication information when the resource allocation information indicates a second resource area.

A seventh aspect of this application provides an uplink information receiving apparatus, including: a determining unit, configured to determine a value of a power control parameter in a value set of the power control parameter, where any value set of the power control parameter includes at least two values; a sending unit, configured to send indication information to a terminal device, where the indication information is used to indicate the value of the power control parameter; and a receiving unit, configured to receive uplink information, where the uplink information is sent by the terminal device at a transmit power adjusted based on the value of the power control parameter.

Optionally, the power control parameter includes at least one of an accumulated power correction value, an absolute power correction value, and a first parameter, and the first parameter includes at least one of the following information: a path loss compensation factor; a target signal-to-noise ratio that is used when a network device receives data from the terminal device; and a power scaling factor.

Optionally, the power control parameter includes the accumulated power correction value, and a maximum value of the accumulated power correction value is 5, 6, 7, or 10.

Optionally, the power control parameter includes the accumulated power correction value, and a minimum value of the accumulated power correction value is −3, −5, or −6.

Optionally, the power control parameter includes the absolute power correction value, and a maximum value of the absolute power correction value is 8, 9, 12, or 16.

Optionally, the power control parameter includes the absolute power correction value, and a minimum value of the absolute power correction value is −8, −9, −12, or −16.

Optionally, the power control parameter includes the accumulated power correction value, and the accumulated power correction value is −2, 0, 2, or 5; or the accumulated power correction value is −2, 0, 2, or 6.

Optionally, the power control parameter includes the absolute power correction value, and the absolute power correction value is −7, −2, 2, or 7; or the absolute power correction value is −6, −1, 1, or 6; or the absolute power correction value is −8, −2, 2, or 8.

Optionally, the power control parameter includes the accumulated power correction value and/or the absolute power correction value, and a value set of the accumulated power correction value and/or a value set of the absolute power correction value are/is configured by using higher layer signaling.

Optionally, the indication information is carried in downlink control information DCI.

Optionally, the indication information is carried in a first field in the DCI, and the first field is a DCI header, a modulation and coding scheme MCS, or a power control adjustment state variable of a physical uplink shared channel PUSCH.

Optionally, the DCI includes terminal-specific DCI or group user common DCI.

Optionally, the sending unit is further configured to send downlink control information DCI or higher layer signaling to the terminal, where the DCI or the higher layer signaling is used to indicate that the value of the power control parameter is the accumulated power correction value or the absolute power correction value.

Optionally, when a service type is URLLC, the DCI or the higher layer signaling is used to indicate that the value of the power control parameter is the absolute power correction value.

Optionally, the uplink information includes a physical uplink shared channel PUSCH, a physical uplink control channel PUCCH, or a sounding reference signal SRS.

An eighth aspect of this application provides an uplink information sending apparatus, including: a receiving unit, configured to receive indication information from a network device, where the indication information is used to indicate a value of a power control parameter, the value of the power control parameter is determined by the network device in a value set of the power control parameter, and any value set of the power control parameter includes at least two values; an adjustment unit, configured to adjust a transmit power based on the value of the power control parameter; and a sending unit, configured to send uplink information at an adjusted transmit power.

Optionally, the power control parameter includes at least one of an accumulated power correction value, an absolute power correction value, and a first parameter, and the first parameter includes at least one of the following information: a path loss compensation factor; a target signal-to-noise ratio that is used when the network device receives data from a terminal device; and a power scaling factor.

Optionally, the power control parameter includes the accumulated power correction value, and a maximum value of the accumulated power correction value is 5, 6, 7, or 10.

Optionally, the power control parameter includes the accumulated power correction value, and a minimum value of the accumulated power correction value is −3, −5, or −6.

Optionally, the power control parameter includes the absolute power correction value, and a maximum value of the absolute power correction value is 8, 9, 12, or 16.

Optionally, the power control parameter includes the absolute power correction value, and a minimum value of the absolute power correction value is −8, −9, −12, or −16.

Optionally, the power control parameter includes the accumulated power correction value, and the accumulated power correction value is −2, 0, 2, or 5; or the accumulated power correction value is −2, 0, 2, or 6.

Optionally, the power control parameter includes the absolute power correction value, and the absolute power correction value is −7, −2, 2, or 7; or the absolute power correction value is −6, −1, 1, or 6; or the absolute power correction value is −8, −2, 2, or 8.

Optionally, the power control parameter includes the accumulated power correction value and/or the absolute power correction value, and a value set of the accumulated power correction value and/or a value set of the absolute power correction value are/is configured by using higher layer signaling.

Optionally, the indication information is carried in downlink control information DCI.

Optionally, the indication information is carried in a first field in the DCI, and the first field is a DCI header, a modulation and coding scheme MCS, or a power control adjustment state variable of a physical uplink shared channel PUSCH.

Optionally, the DCI includes terminal-specific DCI or group user common DCI.

Optionally, the receiving unit is further configured to receive downlink control information DCI or higher layer signaling from the network device, where the DCI or the higher layer signaling is used to indicate that the value of the power control parameter is the accumulated power correction value or the absolute power correction value.

Optionally, when a service type is URLLC, the DCI or the higher layer signaling is used to indicate that the value of the power control parameter is the absolute power correction value.

Optionally, the uplink information includes a physical uplink shared channel PUSCH, a physical uplink control channel PUCCH, or a sounding reference signal SRS.

A ninth aspect of this application provides an uplink information sending apparatus, including: a receiving unit, configured to receive indication information from a network device, where the indication information is used to indicate a second parameter, the second parameter includes an accumulated power correction value or an absolute power correction value, and the indication information is carried in downlink control information DCI; an adjustment unit, configured to adjust a transmit power based on the second parameter; and a sending unit, configured to send uplink information at an adjusted transmit power.

Optionally, the apparatus further includes: a determining unit, configured to determine power control identification information, where the power control identification information is used to identify a first parameter, and the first parameter includes a path loss compensation factor and/or a signal-to-noise ratio that is used when the network device receives data from a terminal device; and the adjustment unit is specifically configured to: adjust the transmit power based on the second parameter and the first parameter.

Optionally, when the DCI is fallback DCI, the power control identification information is first power control identification information, and the first power control identification information is used to identify a first path loss compensation factor and/or a first signal-to-noise ratio that is used when the network device receives data from the terminal device; or when the DCI is non-fallback DCI, the power control identification information is second power control identification information, and the second power control identification information is used to identify a second path loss compensation factor and/or a second signal-to-noise ratio that is used when a network device receives data from the terminal device, where the first power control identification information is different from the second power control identification information.

Optionally, the first path loss compensation factor and the second path loss compensation factor are independently configured; or the first signal-to-noise ratio and the second signal-to-noise ratio are independently configured.

Optionally, when the DCI is the fallback DCI, the terminal device is in a non-radio resource control RRC connected mode or an RRC connected mode; or when the DCI is the non-fallback DCI, the terminal device is in an RRC connected mode.

A tenth aspect of this application provides an uplink information receiving apparatus, including: a sending unit, configured to send indication information to a terminal device, where the indication information is used to indicate a second parameter, the second parameter includes an accumulated power correction value or an absolute power correction value, and the indication information is carried in downlink control information DCI; and a receiving unit, configured to receive uplink information from the terminal device, where the uplink information is sent by the terminal device at a transmit power adjusted based on the second parameter.

Optionally, the uplink information is sent by the terminal device at a transmit power adjusted based on the second parameter and a first parameter, the first parameter is identified by using power control identification information determined by the terminal device, and the first parameter includes a path loss compensation factor and/or a signal-to-noise ratio that is used when a network device receives data from the terminal device.

Optionally, when the DCI is fallback DCI, the power control identification information is first power control identification information, and the first power control identification information is used to identify a first path loss compensation factor and/or a first signal-to-noise ratio that is used when the network device receives data from the terminal device; or when the DCI is non-fallback DCI, the power control identification information is second power control identification information, and the second power control identification information is used to identify a second path loss compensation factor and/or a second signal-to-noise ratio that is used when the network device receives data from the terminal device, where the first power control identification information is different from the second power control identification information.

Optionally, the first path loss compensation factor and the second path loss compensation factor are independently configured; or the first signal-to-noise ratio and the second signal-to-noise ratio are independently configured.

Optionally, when the DCI is the fallback DCI, the terminal device is in a non-radio resource control RRC connected mode or an RRC connected mode; or when the DCI is the non-fallback DCI, the terminal device is in an RRC connected mode.

An eleventh aspect of this application provides an uplink information transmission apparatus, including: a receiving module, configured to receive indication information and resource allocation information from a network device; a determining module, configured to: if the resource allocation information indicates a first resource area, determine a first value of a power control parameter in a first value set of the power control parameter based on the indication information; or if the resource allocation information indicates a second resource area, determine a second value of a power control parameter in a second value set of the power control parameter based on the indication information; an adjustment module, configured to adjust a transmit power based on the first value or the second value; and a sending module, configured to send uplink information based on an adjusted transmit power.

A twelfth aspect of this application provides an uplink information transmission apparatus, including: a sending module, configured to send indication information and resource allocation information to a terminal device; and a receiving module, configured to receive uplink information from the terminal device, where the uplink information is sent by the terminal device at a transmit power adjusted based on a first value and a second value, the first value is a value of a power control parameter that is determined by the terminal device in a first value set of the power control parameter based on the indication information when the resource allocation information indicates a first resource area, and the second value is a value of a power control parameter that is determined by the terminal device in a second value set of the power control parameter based on the indication information when the resource allocation information indicates a second resource area.

The apparatus according to any one of the seventh aspect to the twelfth aspect of this application may be a communications device, or may be a chip in a communications device. The communications device or the chip has a function of implementing the uplink information transmission method according to any one of the foregoing aspects or the possible designs of the foregoing aspects. The function may be implemented by hardware, or may be implemented by hardware executing corresponding software. The hardware or the software includes one or more units corresponding to the foregoing function.

The communications device includes a processing unit and a transceiver unit. The processing unit may be a processor, the transceiver unit may be a transceiver, and the transceiver includes a radio frequency circuit. Optionally, the communications device further includes a storage unit, and the storage unit may be, for example, a memory. When the communications device includes the storage unit, the storage unit is configured to store a computer executable instruction, the processing unit is connected to the storage unit, and the processing unit executes the computer executable instruction stored in the storage unit, so that the communications device performs the uplink information transmission method according to any one of the foregoing aspects or the possible designs of the foregoing aspects.

The chip includes a processing unit and a transceiver unit. The processing unit may be a processor, and the transceiver unit may be an input/output interface, a pin, a circuit, or the like on the chip. The processing unit may execute a computer executable instruction stored in a storage unit, so that the chip performs the uplink information transmission method according to any one of the foregoing aspects or the possible designs of the foregoing aspects. Optionally, the storage unit may be a storage unit (for example, a register or a buffer) in the chip, or the storage unit may be a storage unit (for example, a read-only memory (ROM)) that is in the communications device and that is located outside the chip, another type of static storage device (for example, a random access memory (RAM)) that can store static information and an instruction, or the like.

The processor mentioned earlier may be a central processing unit (CPU), a microprocessor, or an application-specific integrated circuit (ASIC); or may be one or more integrated circuits configured to control execution of a program of the uplink information transmission method according to any one of the foregoing aspects or the possible designs of the foregoing aspects.

A thirteenth aspect of the embodiments of this application provides a computer-readable storage medium, configured to store a computer instruction. When the computer instruction is run on a computer, the computer is enabled to perform the uplink information transmission method according to any one of the first aspect to the fourth aspect of the embodiments of this application.

A fourteenth aspect of the embodiments of this application provides a computer program product including an instruction. When the computer program product is run on a computer, the computer is enabled to perform the uplink information transmission method according to any one of the first aspect to the sixth aspect of the embodiments of this application.

A fifteenth aspect of the embodiments of this application provides a communications apparatus, including a memory and a processor. The memory is configured to store a program instruction; and the processor is configured to invoke the program instruction stored in the memory to implement the method according to any one of the first aspect to the sixth aspect.

According to the uplink information transmission method and apparatus provided in this application, the value of the power control parameter is determined in the value set of the power control parameter, where any value set of the power control parameter includes at least two values; then the indication information is sent to the terminal device, where the indication information is used to indicate the value of the power control parameter; and the uplink information is received, where the uplink information is sent by the terminal device at the transmit power adjusted based on the value of the power control parameter. The network device may determine the value of the power control parameter in the value set including the at least two values, and indicate the determined value of the power control parameter to the terminal device, so that the terminal device adjusts the transmit power for the uplink information based on the determined value of the power control parameter. In this way, the network device may select different values of the power control parameter based on different reliability of transmission services, to further meet requirements of the services with the different reliability, so that a requirement on an operating point change corresponding to the transmission services with the different reliability can be met.

DETAILED DESCRIPTION OF ILLUSTRATIVE EMBODIMENTS

Figure 1:
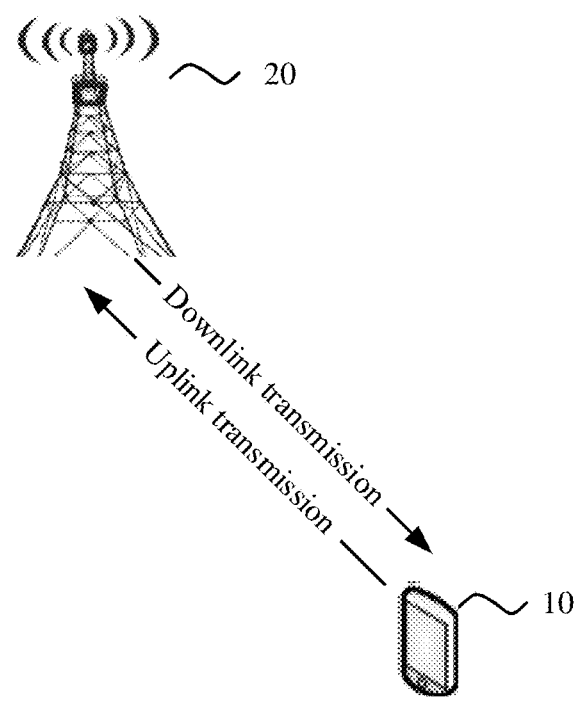
FIG. 1 is a schematic diagram of an architecture of a 5G NR system.

Some terms in this application are described below, to facilitate understanding of a person skilled in the art.

(1) A terminal device may also be referred to as user equipment (user equipment, UE), an access terminal, a subscriber unit, a subscriber station, a mobile station, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a session initiation protocol (SIP) phone, a wireless local loop (WLL) station, a personal digital assistant (PDA) device, a handheld device with a wireless communication function, a computing device, another processing device connected to a wireless modem, a vehicle-mounted device, a wearable device, or a terminal device in a next generation communications system such as a fifth generation (5G) communication network, a future evolved public land mobile network (PLMN), or a new radio (NR) communications system.

By way of example, and not limitation, in the embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, a data exchange, and cloud interaction. Generalized wearable intelligent devices include full-featured and large-size devices, such as smart watches or smart glasses, that can implement complete or partial functions without depending on smartphones and devices, such as various smart bands or smart jewelry for monitoring physical signs, that focus on only one type of application function and need to work with other devices such as smartphones.

In addition, the terminal device may alternatively be an unmanned aerial vehicle, such as an airborne communications device on the unmanned aerial vehicle.

(2) A network device may be a device configured to communicate with a mobile device. The network device may be an access point (AP) in a WLAN, a base transceiver station (BTS) in GSM or CDMA, a NodeB (NB) in WCDMA, an evolved NodeB (eNB or eNodeB) in LTE, a relay station or an access point, a vehicle-mounted device, a wearable device, a network device in a future 5G network, a network device in a future evolved PLMN network, a new generation NodeB (gNodeB) in an NR system, or the like.

In addition, in the embodiments of this application, the network device provides a service to a cell. The terminal device communicates with the network device by using a transmission resource (for example, a frequency domain resource or a spectrum resource) used in the cell. The cell may be a cell corresponding to the network device (for example, a base station). The cell may belong to a macro base station, or a base station corresponding to a small cell. The small cell herein may include a metro cell, a micro cell, a pico cell, a femto cell, or the like. The small cells are characterized by small coverage and a low transmit power, and are applicable to provide high-rate data transmission services.

(3) A unit in this application is a functional unit or a logical unit. The unit may be in a form of software, and a function of the unit is implemented by a processor executing program code; or the unit may be in a form of hardware.

(4) "A plurality of" refers to two or more, and other quantifiers are similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. A range described by using "above", "below", or the like includes boundary points.

A person skilled in the art may understand that an uplink information transmission method provided in the embodiments of this application may be applied to a 5th generation (5G) network and a subsequent evolved communications system, or may be applied to another wireless communications network. FIG. 1 is a schematic diagram of an architecture of a 5G NR system. As shown in FIG. 1, the system includes a terminal 10 and a network device 20. The terminal 10 may be, for example, UE, and the network device 20 may be a base station. A process in which the base station transmits data to the terminal is downlink transmission, and a process in which the terminal 10 transmits data to the base station 20 is uplink transmission.

In addition, the uplink information transmission method provided in the embodiments of this application may further be applied to a device in the air, for example, may be specifically applied to a system of determining a value of a power control parameter in an unmanned aerial vehicle. For example, a power control parameter used by a device in the air communicating with a ground device and a power control parameter used by the ground device may be independently configured. Therefore, when adjusting a data transmit power, the device in the air may also determine a value of the power control parameter by using the method in this application.

Based on the system architecture shown in FIG. 1, the international telecommunication union (ITU) defines three types of application scenarios for 5G and a future mobile communications system: enhanced mobile broadband (eMBB), ultra-reliable low-latency communication (URLLC), and massive machine-type communications (mMTC).

Scenarios corresponding to URLLC applications include unmanned driving, industrial control, and the like, and require a low latency and high reliability. Specific requirements for the low latency are an end-to-end latency of 0.5 ms, and a round trip latency of 1 ms during air-interface information exchange. A specific requirement for the high reliability is that a block error rate (BLER) reaches $10^{-5}$, in other words, a percentage of correctly received data packets reaches 99.999%. eMBB services include an ultra-high definition video, augmented reality (AR), virtual reality (VR), and the like. These services are mainly characterized by a large data transmission amount, a high transmission rate, a corresponding time length of 0.5 ms, a corresponding BLER of $10^{-1}$, and a reliability requirement of 90%, namely, a percentage 90% of correctly received packets. Therefore, reliability changes from 90% for the eMBB service to 99.999% for the URLLC service, a corresponding block error rate (BLER) changes from $10^{-1}$ for the eMBB service to $10^{-5}$ for the URLLC service, and a maximum change range of a corresponding signal-to-noise ratio (SNR), namely, a maximum operating point change range can reach 5 dB to 10 dB. It should be understood that, a person skilled in the art usually refers to a required SNR corresponding to a service having a reliability requirement as an operating point corresponding to the service. The operating point in this application document refers to a corresponding required SNR. For a current adjustment value of a parameter transmit power control (TPC) command field (TPC control command field) of current power control adjustment, an adjustment range of an accumulated power correction value is −1 dB to 3 dB, and an adjustment range of an absolute power correction value is −4 dB to 4 dB. Therefore, the current adjustment value of the TPC command field does not meet a requirement for an operating point change from the eMBB service to the URLLC service.

In consideration of these cases, an embodiment of this application provides an uplink information transmission method. A network device determines a value of a power control parameter in a value set of the power control parameter, where any value set of the power control parameter includes at least two values; then sends indication information to a terminal device, where the indication information is used to indicate the value of the power control parameter; and receives uplink information, where the uplink information is sent by the terminal device at a transmit power adjusted based on the value of the power control parameter. The network device may determine the value of the power control parameter in the value set including the at least two values, and indicate the determined value of the power control parameter to the terminal device, so that the terminal device adjusts the transmit power for the uplink information based on the determined value of the power control parameter. In this way, the network device may select different values of the power control parameter based on different reliability of transmission services, to further meet requirements of the services with the different reliability, so that a requirement on an operating point change corresponding to the transmission services with the different reliability can be met.

Figure 2:
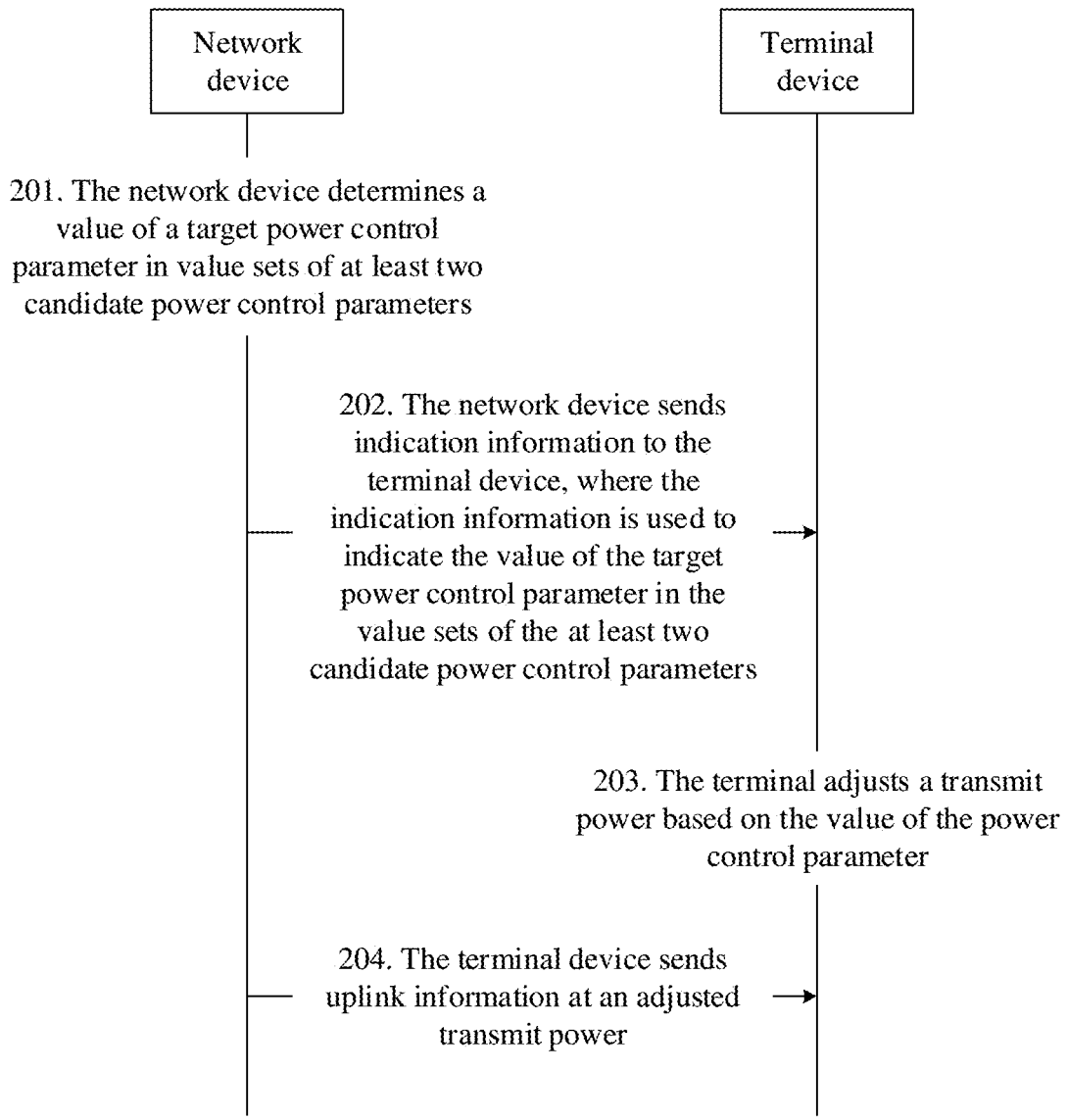
FIG. 2 is a signaling flowchart of an uplink information transmission method according to this application.

FIG. 2 is a signaling flowchart of an uplink information transmission method according to this application. Based on the system architecture shown in FIG. 1, the method in this embodiment may include the following steps as shown in FIG. 2.

Step 201: The network device determines a value of a power control parameter in a value set of a power control parameter.

Any value set of the power control parameter includes at least two values.

In a possible implementation, a physical uplink shared channel (PUSCH) is used as an example. In NR, a power control formula of the PUSCH is shown in a formula (1):

$$P_{PUSCH,f,c}(i, j, q_d, l) = \min\left\{ \begin{array}{l} P_{CMAX,f,c}(i), \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{array} \right\} \quad (1)$$

where c is a serving cell, i is a transmission period of the PUSCH, j is identification information of the power control parameter, l is a power control adjustment state index, f is a carrier, $q_d$ is a reference signal resource used by the terminal device, $P_{PUSCH,f,c}$ is a transmit power for the PUSCH in the serving cell, $P_{CMAX,f,c}$ a maximum transmit power that is allowed by the terminal device on the carrier and in the serving cell, $P_{O\_PUSCH,f,c}$ is a target signal-to-noise ratio that is used when the network device receives data from the terminal device, $M_{RB,f,c}^{PUSCH}$ is resource allocation bandwidth indication information of the PUSCH in the serving cell, $\alpha_{f,c}$ is path loss compensation factor, $PL_{f,c}$ is a path loss value, $\Delta_{TF,f,c}$ is a modulation scheme offset and $\Delta_{TF,f,c}$ is used to control a power for transmitting information on the PUSCH, $f_{f,c}$ is a closed-loop power control adjustment state, where $f_{f,c}(i,l)=f_{f,c}(i-1,l)+\delta_{PUSCH,f,c}(i-K_{PUSCH},l)$, $\delta_{PUSCH,f,c}$ is an absolute power correction value or an accumulated power correction value, $i-K_{PUSCH}$ is a subframe number for sending $\delta_{PUSCH,f,c}$, and μ is a subcarrier spacing and a cyclic prefix number.

It can be learned from the formula (1) that, during power adjustment, a value of at least one parameter of the path loss compensation factor $\alpha_{f,c}$, the target signal-to-noise ratio $P_{0\_PUSCH,f,c}$ that is used when the network device receives the data from the terminal device, the absolute power correction value, or the accumulated power correction value may be adjusted. Therefore, in a possible implementation, the power control parameter includes at least one of the accumulated power correction value, the absolute power correction value, and a first parameter; and the first parameter includes at least one of the following information: the path loss compensation factor, the target signal-to-noise ratio that is used when the network device receives the data from the terminal device, and a power scaling factor.

It may be understood that the base station determines the value of the power control parameter that is to be adjusted in the foregoing value set of the power control parameter.

Reliability changes from 90% for an eMBB service to 99.999% for a URLLC service, a corresponding BLER changes from $10^{-1}$ for the eMBB service to $10^{-5}$ for the URLLC service, and a maximum corresponding operating point change range can reach 5 dB to 10 dB. Therefore, to meet a requirement on an operating point change, the network device may determine the value of the power control parameter in the value set including the at least two values, and indicate the determined value of the power control parameter to the terminal device, so that the terminal device adjusts a transmit power for uplink information based on the determined value of the power control parameter. In this way, the network device may select different values of the power control parameter based on different reliability of transmission services, to further meet requirements of the services with the different reliability, so that a requirement on an operating point change corresponding to the transmission services with the different reliability can be met.

Using the path loss compensation factor $\alpha_{f,c}$ as an example, a service whose reliability is greater than a preset threshold requires relatively high path loss compensation, and a value of $\alpha_{f,c}$ may be set to 1. However, a service whose reliability requirement is not high has a relatively low requirement on path loss compensation, and a value of $\alpha_{f,c}$ may be set to 0.5. Using the target signal-to-noise ratio $P_{0\_PUSCH,f,c}$ that is used when the network device receives the data from the terminal device as another example, for a service having a relatively high reliability requirement, signal energy expected to be received by the terminal device is relatively high, so that a signal-to-noise ratio is relatively high, and therefore, the target signal-to-noise ratio $P_{0\_PUSCH,f,c}$ needs to be set to a relatively large value; for a service having a relatively low reliability requirement, a target signal-to-noise ratio expected by the terminal device for receiving is not very high, so that $P_{0\_PUSCH,f,c}$ needs to be set to a relatively small value.

In addition, for the power scaling factor, when reliability required by a service is greater than a preset threshold, the network device expects to receive data at a relatively high transmit power is, so that a transmit power of the terminal device needs to be increased, to reduce interference from another service in a transmission process. In this case, the power scaling factor may be, for example, 120%, to be specific, the transmit power is multiplied by 120%, to obtain an adjusted transmit power. When reliability required by a service is less than a preset threshold, the network device has a low requirement on a transmit power for data transmission of the service, and even needs to suppress the transmit power for the data transmission of the service. In this case, the power scaling factor may be, for example, 80%, to be specific, the transmit power is multiplied by 80%, to obtain an adjusted transmit power, thereby reducing interference of the service to another service having a relatively high reliability requirement.

Further, in a data transmission process, a grant free (grant free) resource is specially configured for burst URLLC service transmission. However, the URLLC service is aperiodic, if the resource is always retained, but no URLLC service is transmitted, the resource is idle, leading to reduction of resource utilization and spectrum utilization. Therefore, a conventional eMBB service that has no excessively high requirement on a latency and reliability may also be transmitted on the grant free resource. In addition, the eMBB service is mainly transmitted on a grant based resource. Because the data volume of the eMBB service is large and stable, but the grant based resource may also be preempted by the URLLC service, or a grant based resource is scheduled to exclusively carry the URLLC service. Both the grant free resource and the grant based resource may be used to transmit the eMBB service and the URLLC service.

When data transmission on a grant free resource is switched to data transmission on a grant based resource, downlink control information (DCI) is usually used for indication. The value of the power control parameter remains unchanged, to be specific, a value of the power control parameter that corresponds to the grant free resource is still used, for example, the value of the path loss compensation factor, the target signal-to-noise ratio that is used when the network device receives the data from the terminal device, or the power scaling factor remains unchanged if the DCI indicates that the transmission on the grant free resource is switched to the transmission on the grant based resource, and if reliability of a service remains unchanged, or a service type remains unchanged. For example, an eMBB service is transmitted on the grant free resource, and after the switching to the transmission on the grant based resource, the eMBB service is still transmitted; or a URLLC service is transmitted on the grant free resource, and after the switching to the transmission on the grant based resource, the URLLC service is still transmitted.

The value of the power control parameter is changed to a value of the power control parameter that corresponds to the grant based resource, for example, the value of the path loss compensation factor, the target signal-to-noise ratio that is used when the network device receives data from the terminal device, or the power scaling factor is changed to a value of the parameter that corresponds to the grant based resource if the DCI indicates that the transmission on the grant free resource is switched to the transmission on the grant based resource, and if reliability of a service is changed or a service type is changed. For example, an eMBB service is transmitted on the grant free resource, and after the switching to the transmission on the grant based resource, a URLLC service is transmitted; or a URLLC service is transmitted on the grant free resource, and after the switching to the transmission on the grant based resource, an eMBB service is transmitted.

When the data transmission on the grant free resource is switched to the data transmission on the grant based resource, and the service type is changed, the value of the power control parameter is also changed correspondingly.

Therefore, the terminal device may adjust the transmit power based on different services, to meet requirements of services with different reliability.

In addition, for a current power control adjustment state variable TCP command field, an adjustment range of the accumulated power correction value is −1 dB to 3 dB, and an adjustment range of the absolute power correction value is −4 dB to 4 dB, as shown in Table 1 below.

TABLE 1

| Power control adjustment state variable (TCP command field) | Accumulated power correction value [dB] (accumulated $\delta_{PUSCH,c}$) | Absolute power correction value [dB] (absolute $\delta_{PUSCH,c}$) |
| --- | --- | --- |
| 0 | −1 | −4 |
| 1 | 0 | −1 |
| 2 | 1 | 1 |
| 3 | 3 | 4 |

Because the reliability changes from 90% for the eMBB service to 99.999% for the URLLC service, and the corresponding BLER changes from $10^{-1}$ for the eMBB service to $10^{-5}$ for the URLLC service, the maximum corresponding operating point change range can reach 5 dB to 10 dB based on a simulation result. Therefore, a current transmit power control adjustment value does not meet a requirement on an operating point range change from the eMBB service to the URLLC service.

To resolve this problem, in this embodiment of the present invention, specific values of the accumulated power correction value and the absolute power correction value that correspond to the TPC command field may include the following several forms:

First form: The TPC command field may be extended to three bits, and a possible implementation of the accumulated power correction value and the absolute power correction value that correspond to the TPC command field is shown in Table 2:

TABLE 2

| Power control adjustment state variable (TCP command field) | Accumulated power correction value [dB] (accumulated $\delta_{PUSCH,c}$) | Absolute power correction value [dB] (absolute $\delta_{PUSCH,c}$) |
| --- | --- | --- |
| 0 | −3 | −8 |
| 1 | −1 | −4 |
| 2 | 0 | −1 |
| 3 | 1 | 1 |
| 4 | 3 | 4 |
| 5 | 5 | 8 |

Two values are added in Table 2 based on Table 1, so that the adjustment range of the accumulated power correction value (accumulated $\delta_{PUSCH,e}$) can reach −3 dB to 5 dB, and the adjustment range of the absolute power correction value can reach −8 dB to 8 dB. In this way, the requirement on the operating point range change from the eMBB service to the URLLC service can be met.

Further, when reliability of a service reaches 99.9999%, and a BLER reaches $10^{-6}$ or when another service may be transmitted with the eMBB service simultaneously, and reliability of the service is 99.9999%, an operating point changes by more than 5 dB. Therefore, to meet a requirement for a larger operating point range of different services, values may be further added to Table 2. Another possible implementation of the accumulated power correction value and the absolute power correction value that correspond to the TPC command field is shown in Table 3.

TABLE 3

| Power control adjustment state variable (TCP command field) | Accumulated power correction value [dB] (accumulated $\delta_{PUSCH,c}$) | Absolute power correction value [dB] (absolute $\delta_{PUSCH,c}$) |
| --- | --- | --- |
| 0 | −5 | −12 |
| 1 | −3 | −8 |
| 2 | −1 | −4 |
| 3 | 0 | −1 |
| 4 | 1 | 1 |
| 5 | 3 | 4 |
| 6 | 5 | 8 |
| 7 | 7 | 12 |

In Table 3, the operating point can be expanded to 12 dB. In addition, transmission of the URLLC service may be switched back to transmission of the eMBB service by using one accumulated power correction value (accumulated $\delta_{PUSCH,e}$), and the operating point is reduced by 5 dB. For example, when the TCP command field is 0, a corresponding accumulated power correction value is −5 dB, that is, the closed-loop power control adjustment state $f_c$ is reduced by 5 dB, that is, the operating point is reduced by 5 dB. Correspondingly, in a white Gaussian noise channel, the block error rate is changed from $10^{-5}$ to $10^{-1}$, where a service corresponding to $10^{-5}$ is the URLLC service, and a service corresponding to $10^{-1}$ is the eMBB service, that is, the transmission of the URLLC service is switched back to the transmission of the eMBB service.

Optionally, another possible implementation of the accumulated power correction value and the absolute power correction value that correspond to the TPC command field is shown in Table 4:

TABLE 4

| Power control adjustment state variable (TCP command field) | Accumulated power correction value [dB] (accumulated $\delta_{PUSCH,c}$) | Absolute power correction value [dB] (absolute $\delta_{PUSCH,c}$) |
| --- | --- | --- |
| 0 | −3 | −9 |
| 1 | −1 | −4 |
| 2 | 0 | −1 |
| 3 | 1 | 1 |
| 4 | 3 | 4 |
| 5 | 6 | 9 |

Optionally, another possible implementation of the accumulated power correction value and the absolute power correction value that correspond to the TPC command field is shown in Table 5:

TABLE 5

| Power control adjustment state variable (TCP command field) | Accumulated power correction value [dB] (accumulated $\delta_{PUSCH,c}$) | Absolute power correction value [dB] (absolute $\delta_{PUSCH,c}$) |
| --- | --- | --- |
| 0 | −6 | −16 |
| 1 | −3 | −9 |
| 2 | −1 | −4 |
| 3 | 0 | −1 |
| 4 | 1 | 1 |
| 5 | 3 | 4 |
| 6 | 6 | 9 |
| 7 | 10 | 16 |

As shown in Table 2 to Table 5, when the power control parameter includes the accumulated power correction value, a maximum value of the accumulated power correction value is 5, 6, 7, or 10, and a minimum value of the accumulated power correction value is −3, −5, or −6.

When the power control parameter includes the absolute power correction value, a maximum value of the absolute power correction value is 8, 9, 12, or 16, and a minimum value of the absolute power correction value is −8, −9, −12, or −16.

Because the adjustment range of the absolute power correction value and the adjustment range of the accumulated power correction value are expanded, requirements of services with different reliability can be met, so that a requirement on an operating point change corresponding to the transmission services with the different reliability can be met.

Second form: The TPC command field is two bits, and a possible implementation of the accumulated power correction value and the absolute power correction value that correspond to the TPC command field is shown in Table 6, Table 7, or Table 8.

TABLE 6

| Power control adjustment state variable (TCP command field) | Accumulated power correction value [dB] (accumulated $\delta_{PUSCH, c}$) | Absolute power correction value [dB] (absolute $\delta_{PUSCH, c}$) |
|---|---|---|
| 0 | −2 | −7 |
| 1 | 0 | −2 |
| 2 | 2 | 2 |
| 3 | 5 | 7 |

TABLE 7

| Power control adjustment state variable (TCP command field) | Accumulated power correction value [dB] (accumulated $\delta_{PUSCH, c}$) | Absolute power correction value [dB] (absolute $\delta_{PUSCH, c}$) |
|---|---|---|
| 0 | −1 | −6 |
| 1 | 0 | −1 |
| 2 | 1 | 1 |
| 3 | 5 | 6 |

TABLE 8

| Power control adjustment state variable (TCP command field) | Accumulated power correction value [dB] (accumulated $\delta_{PUSCH, c}$) | Absolute power correction value [dB] (absolute $\delta_{PUSCH, c}$) |
|---|---|---|
| 0 | −2 | −8 |
| 1 | 0 | −2 |
| 2 | 2 | 2 |
| 3 | 6 | 8 |

In Table 6, Table 7, or Table 8, the accumulated power correction value (accumulated $\delta_{PUSCH,c}$) and the absolute power correction value (absolute $\delta_{PUSCH,c}$) are modified based on Table 1, to meet the requirement on the operating point range change from the eMBB service to the URLLC service.

Optionally, it can be learned from Table 6 to Table 8 that when the power control parameter includes the accumulated power correction value, the accumulated power correction value is −2, 0, 2, or 5; or the accumulated power correction value is −2, 0, 2, or 6.

When the power control parameter includes the absolute power correction value, the absolute power correction value is −7, −2, 2, or 7; or the absolute power correction value is −6, −1, 1, or 6; or the absolute power correction value is −8, −2, 2, or 8.

Because the adjustment range of the absolute power correction value and the adjustment range of the accumulated power correction value are expanded, requirements of services with different reliability can be met, so that a requirement on an operating point change corresponding to the transmission services with the different reliability can be met.

In addition, a person skilled in the art may understand that the power control parameter includes the accumulated power correction value and/or the absolute power correction value, and a value set of the accumulated power correction value and/or a value set of the absolute power correction value are/is configured by using higher layer signaling.

Specifically, the accumulated power correction value and/or the absolute power correction value that are/is included in the power control parameter may be configured by using the higher layer signaling. For example, the accumulated power correction value and/or the absolute power correction value in the foregoing Table 2 to Table 8 may be configured by using the higher layer signaling. The higher layer signaling may be, for example, radio resource control (RRC) signaling.

Further, in a possible implementation, the network device determines that the power control parameter includes the accumulated power correction value or the absolute power correction value, and the network device sends downlink control information (downlink control information, DCI) or higher layer signaling to the terminal device, where the DCI or the higher layer signaling is used to indicate whether the value of the power control parameter is the accumulated power correction value or the absolute power correction value. The higher layer signaling may be, for example, an RRC message.

In addition, a person skilled in the art may understand that the absolute power correction value is only used for one power adjustment, and the accumulated power correction value may be iterated based on one or more previous closed-loop power control adjustment states $f_{f,c}$. When a data volume of uplink transmission data transmitted by the terminal device is less than a preset threshold, for example, when the URLLC service is transmitted, due to a relatively small data volume, usually only one power adjustment may be required to meet the requirement. Therefore, when adjusting the transmit power, the terminal device may use only the absolute power correction value instead of the accumulated power correction value. Correspondingly, when transmitting a service, such as the URLLC service, with a relatively small data volume, the terminal device sends a message to the network device, to notify the network device that this type of service is to be transmitted. In this case, the network device sends DCI or higher layer signaling to the terminal device, to indicate that the value of the power control parameter is the absolute power correction value.

The network device sends the DCI or the higher layer signaling to the terminal device, to indicate that the value of the power control parameter is the accumulated power correction value or the absolute power correction value, so that the terminal device can correctly adjust the transmit power by using the value of the power control parameter, thereby improving accuracy of transmit power adjustment.

Further, because for the adjustment value of the TCP command field shown in Table 1, the adjustment range of the accumulated power correction value is −1 dB to 3 dB, and the adjustment range of the absolute power correction value is −4 dB to 4 dB, when the network device determines that a service transmitted by the terminal device is a service, such as the eMBB service, whose reliability is less than a preset threshold, the network device may determine the value of the power control parameter based on a value set shown in Table 1.

In addition, in a possible implementation, the network device may store a plurality of tables, for example, Table 2 to Table 8. For the adjustment value of the TCP command field shown Table 2 to Table 8, the adjustment range of the accumulated power correction value is greater than −1 dB to 3 dB, and the adjustment range of the absolute power correction value is greater than −4 dB to 4 dB. Therefore, the network device determines that a service transmitted by the terminal device is a service, such as the URLLC service, whose reliability is greater than the preset threshold, or a service whose BLER is not $10^{-1}$ and that has other reliability. A plurality of tables may be configured in the base station, so that the value of the power control parameter may be determined based on data in any one of Table 2 to Table 8.

In addition, in a data transmission process, a type of a transmitted service may change, or transmission with different reliability requirements may be switched. This causes a transmission operating point change. To meet a requirement on the operating point change, the closed-loop power control parameter needs to be adjusted. To be specific, when service types are switched or transmission with different reliability requirements are switched, the network device may determine the value of the power control parameter based on the values in the foregoing different tables. For example, if an eMBB service is transmitted by the terminal device, the network device determines the value of the power control parameter based on the values in Table 1. If a burst URLLC service occurs during the transmission of the eMBB service, the network device determines a latest value of the power control parameter in values in any one of Table 2 to Table 8 to meet a requirement on an operating point change corresponding to different reliability.

Step 202: The network device sends indication information to the terminal device, where the indication information is used to indicate the value of the power control parameter.

In this step, after determining the value of the power control parameter in the value set of the power control parameter based on the reliability of the service type, the network device sends the indication information to the terminal device, and the indication information may be used to indicate the value of the power control parameter.

In a possible implementation, the indication information is carried in DCI.

Specifically, the indication information may be carried in a first field in the DCI, to be specific, the value of the power control parameter may be indicated by using the first field in the DCI. The first field may be an original field, or a newly added field in the DCI.

The value of the power control parameter may be indicated by using the first field in the DCI in the following several manners:

In a first manner, a DCI field of at least one bit is newly configured in the DCI, and the DCI field is used to indicate a power control parameter and a value corresponding to the power control parameter.

For example, if the DCI field is one bit, when a value of the bit is set to 1, it indicates that the power control parameter includes the path loss compensation factor α and the target signal-to-noise ratio P0 that is used when the network device receives the data from the terminal device, where the value of α is 1 and the value of P0 is 5, that is, it indicates a value of the power control parameter that corresponds to a service whose reliability is greater than the preset threshold; or when a value of the bit is set to 0, it indicates that the power control parameter includes the path loss compensation factor α and the target signal-to-noise ratio P0 that is used when the network device receives the data from the terminal device, where the value of a is 0.5 and the value of P0 is 5, that is, it indicates a value of the power control parameter that corresponds to a service whose reliability is less than the preset threshold.

In addition, the 1-bit DCI field may further indicate scaling factors corresponding to different reliability. For example, when the bit in the DCI field is set to 0, the scaling factor may be, for example, 120%; or when the bit in the DCI field is set to 1, the scaling factor may be, for example, 80%.

A person skilled in the art may understand that the 1-bit DCI field may indicate two different groups of values of the power control parameter. Certainly, the DCI field may alternatively be configured to two bits. In this case, the DCI field indicates four groups of values of a power control parameter that correspond to different reliability. Alternatively, the DCI field may alternatively be configured to three bits. In this case, the DCI field may indicate eight groups of values of the power control parameter that correspond to different reliability degrees. Alternatively, the DCI field may alternatively be configured to four bits. In this case, the DCI field indicates 16 groups of values of a power control parameter, and so on. A quantity of bits of the DCI field may be configured based on a quantity of values of a power control parameter that need to be actually indicated. For example, the DCI field may be configured to one bit or two bits. This is not limited in this embodiment of this application.

In addition, when the DCI field is configured to at least two bits, the plurality of bits may be used to indicate a plurality of groups of power control parameters of different types. For example, if the DCI field is two bits, one bit may be used to indicate the path loss compensation factor α, and the other bit is used to indicate the scaling factor. Alternatively, one bit in the two bits is used to indicate the target signal-to-noise ratio P0 that is used when the network device receives the data from the terminal device, and the other bit is used to indicate the scaling factor. Alternatively, one bit in the two bits is used to indicate the path loss compensation factor α and the target signal-to-noise ratio P0 that is used when the network device receives the data from the terminal device, and the other bit is used to indicate the scaling factor. When the DCI field is configured to a plurality of bits, a manner in which the plurality of bits are used to indicate values of a plurality of groups of power control parameters of different types is similar to the indication manner used when the DCI field is configured to two bits, and details are not described herein again.

It should be noted that the newly configured DCI field may further be used to indicate the path loss compensation factor, the target signal-to-noise ratio that is used when the network device receives the data from the terminal device, or the power scaling factor.

In the foregoing implementation, the DCI field of at least one bit is newly configured in the DCI, and the DCI field is used to indicate the power control parameter and the value corresponding to the power control parameter. In this way, different values of the power control parameter can be flexibly indicated for services with different reliability. In addition, it is simple and easy to indicate the value of the power control parameter by directly using the newly configured DCI field of at least one bit.

In a second manner, a modulation and coding scheme (modulation and coding scheme, MCS) field in the DCI is used to implicitly indicate a power control parameter and a value corresponding to the power control parameter.

Specifically, a difference between this manner and the first manner lies in that in the first manner, the at least one bit newly configured in the DCI are used to directly indicate values of a power control parameter that correspond to services with different reliability, while in this manner, a parameter and a feature that originally have other functions in the DCI are used to implicitly indicate different values of a power control parameter, for example, the MCS field is used to implicitly indicate different values of the power control parameter.

The MCS field in the DCI includes five bits, and is used to indicate a modulation and coding scheme used for a scheduled resource. In this manner, the MCS field may be used to implicitly indicate a power control parameter and a value corresponding to the power control parameter. In an actual application, a power control parameter and a value corresponding to the power control parameter may be indicated by using the following two methods:

(1) An original function of the MCS field is used to implicitly indicate values of a power control parameter that correspond to services with different reliability. For example, because in a modulation scheme with a lower modulation order, each modulation symbol carries a relatively small quantity of data bits, and can tolerate relatively intensive interference. However, higher-order modulation can provide a higher transmission bit rate, has relatively poor anti-interference and anti-noise capabilities, is highly sensitive to a channel estimation error, and is error prone. Therefore, the higher-order modulation is applicable to transmission in a high signal-to-noise ratio condition. Therefore, when the MCS field indicates the modulation scheme with the relatively low modulation order, such as quadrature phase shift keying (QPSK) or 16 quadrature amplitude modulation (QAM), it indicates that a service to be carried by the terminal device needs relatively high reliability. In this case, the MCS field may implicitly indicate a value of a power control parameter that corresponds to a service whose reliability is greater than the preset threshold, for example, indicate that the power control parameter is the path loss compensation factor α and the target signal-to-noise ratio P0 that is used when the network device receives the data from the terminal device, where a is 1 and P0 is 5. When the MCS field indicates the modulation scheme with the relatively high modulation order, the MCS field implicitly indicates a value of a power control parameter that corresponds to a service whose reliability is less than the preset threshold, for example, indicates that the power control parameter is the path loss compensation factor α and the target signal-to-noise ratio P0 that is used when the network device receives the data from the terminal device, where α is 0.5 and P0 is 5.

(2) A bit in the MCS field is reused to indicate a value of a power control parameter. If one bit in the MCS field is reused, when a value of the bit is set to 1, it indicates that the power control parameter is the path loss compensation factor α and the target signal-to-noise ratio P0 that is used when the network device receives the data from the terminal device, where a is 1 and P0 is 5, that is, it indicates a value of a power control parameter that corresponds to a service whose reliability is greater than the preset threshold; or when a value of the bit is set to 0, it indicates that the power control parameter is the path loss compensation factor α and the target signal-to-noise ratio P0 that is used when the network device receives the data from the terminal device, where a is 0.5 and P0 is 5, that is, it indicates a value of a power control parameter that corresponds to a service whose reliability is less than the preset threshold. Certainly, a plurality of bits in the MCS field may alternatively be reused. For example, when two bits are reused, four values 00, 01, 10, and 11 may be respectively used to indicate values of a power control parameter that correspond to four different reliability. Certainly, three bits, four bits, five bits, or the like in the MCS field may alternatively be reused to indicate a power control parameter and values of the power control parameter that correspond to more reliability degrees.

It should be noted that, because the MCS field has five bits, the plurality of bits in the MCS may be used to indicate a group of values of the power control parameter. A quantity of bits in the MCS that are used to indicate the value of the power control parameter may be set based on an actual situation. This is not limited in this embodiment of this application.

It should be noted that the MCS field may be used to indicate the path loss compensation factor, the target signal-to-noise ratio that is used when the network device receives the data from the terminal device, or the power scaling factor.

In the foregoing implementation, the power control parameter and the value corresponding to the power control parameter are implicitly indicated by using the MCS field in the DCI. In this way, an original field in the DCI field can be reused, and a new field does not need to be added to indicate the power control parameter and the value corresponding to the power control parameter, thereby saving signaling resources.

In a third manner, a header field in the DCI is used to implicitly indicate a power control parameter and a value corresponding to the power control parameter.

Specifically, the header field in the DCI is used to distinguish whether DCI with a same payload size is uplink DCI or downlink DCI. In this manner, the header field in the DCI may be used to implicitly indicate a power control parameter and a value corresponding to the power control parameter. In an actual application, a power control parameter and a value corresponding to the power control parameter may be indicated by using the following two methods:

(1) A bit in the header field is reused to indicate a power control parameter and a value corresponding to the power control parameter. If one bit in the header field is reused, when a value of the bit is set to 1, it indicates that the power control parameter is the path loss compensation factor α and the target signal-to-noise ratio P0 that is used when the network device receives the data from the terminal device, where a is 1 and P0 is 5, that is, it indicates a value of a power control parameter that corresponds to a service whose reliability is greater than the preset threshold; or when a value of the bit is set to 0, it indicates that the power control parameter is the path loss compensation factor α and the target signal-to-noise ratio P0 that is used when the network device receives the data from the terminal device, where a is 0.5 and P0 is 5, that is, it indicates a value of a power control parameter that corresponds to a service whose reliability is less than the preset threshold.

It should be noted that in this manner, one bit in the header field may be reused, or a plurality of bits in the header field may be reused. For example, assuming that two bits in the header field are reused, four values 00, 01, 10, and 11 may be respectively used to indicate values of a power control parameter that correspond to four different reliability. Certainly, three bits, four bits, five bits, or the like in the header field may be reused to indicate values of a power control parameter that correspond to more reliability degrees.

(2) An original function of the header field is used to implicitly indicate values of a power control parameter that correspond to services with different reliability. For example, when the header field indicates compact DCI or fallback DCI, it indicates that a service to be carried by the terminal device needs relatively high reliability. In this case, the header field may be used to implicitly indicate a value of a power control parameter that corresponds to a service whose reliability is greater than the preset threshold, for example, indicate that the power control parameter includes the path loss compensation factor $\alpha$ and the target signal-to-noise ratio P0 that is used when the network device receives the data from the terminal device, where the value of a is 1 and the value of P0 is 5. When the header field indicates common uplink/downlink DCI, it indicates that a service to be carried needs relatively low reliability. In this case, the header field may be used to implicitly indicate a value of a power control parameter that corresponds to a service whose reliability is less than the preset threshold, for example, indicate that the power control parameter includes the path loss compensation factor $\alpha$ and the target signal-to-noise ratio P0 that is used when the network device receives the data from the terminal device, where the value of a is 0.5 and the value of P0 is 5.

It should be noted that the header field may be used to indicate the path loss compensation factor, the target signal-to-noise ratio that is used when the network device receives the data from the terminal device, or the power scaling factor.

In the foregoing implementation, the power control parameter and the value corresponding to the power control parameter are implicitly indicated by using the header field in the DCI. In this way, an original field in the DCI field can be reused, and a new field does not need to be added to indicate the power control parameter and the value corresponding to the power control parameter, thereby saving signaling resources.

In a fourth manner, a radio network temporary identifier (RNTI) in the DCI is used to implicitly indicate a power control parameter and a value corresponding to the power control parameter.

Specifically, the RNTI is a dynamic identifier allocated by the base station to the terminal. There are many types of RNTIs, and different types of RNTIs have different functions. Even if RNTIs of a same type are allocated to different terminals, the RNTIs may be distinguished from each other. In this manner, DCI scrambled by using different RNTIs based on this feature is used to implicitly indicate values of a power control parameter that correspond to different reliability.

The RNTIs are mainly classified into the following types: slot format information-radio network temporary identifier (SFI-RNTI): used to indicate slot format information, where the slot format information indicates downlink transmission resources, uplink transmission resources, or unknown transmission resources in one or more slots. A cyclic redundancy check (CRC) in such a DCI format is scrambled by using the SFI-RNTI, but the DCI is not used to schedule a data channel; paging-radio network temporary identifier (P-RNTI): used to identify transmission of a paging message, and scramble a CRC on a DCI format schedules a downlink data channel; system information-radio network temporary identifier (SI-RNTI): a system message used to identify transmission of a system information block (SIB), and scramble a CRC on a DCI format schedules a downlink data channel; random access-radio network temporary identifier (RA-RNTI): used to identify a random access response, and scramble a CRC on a DCI format schedules a downlink data channel; semi-persistent state-radio network temporary identifier/grant free-radio network temporary identifier (SPS-RNTI/grant free-RNTI): used to indicate that scheduled data is data in a semi-persistent scheduling mode, or that scheduled transmission is re-transmission of previous grant free data, where the SPS/grant free-RNTI may be used for uplink transmission; cell-radio network temporary identifier (C-RNTI): used to dynamically schedule transmission of a physical downlink shared channel (PDSCH); and temporary cell-radio network temporary identifier (TC-RNTI): a temporary C-RNTI.

DCI corresponding to the TPC-PUSCH-RNTI, the TPC-PUCCH-RNTI, and the TPC-SRS-RNTI is respectively used to transmit a TPC command to a physical uplink shared channel (PUSCH), a physical uplink control channel (PUCCH), and a sounding reference signal (SRS).

Because the power control parameter is for uplink transmission, power control parameters corresponding to services with different reliability may be implicitly indicated by using the SPS/grant free-RNTI, the C-RNTI, the TC-RNTI, the TPC-PUSCH-RNTI, the TPC-PUCCH-RNTI, and the TPC-SRS-RNTI.

It should be noted that, because RNTIs of a same type that are allocated to different DCI also represent different meanings, the RNTIs of the same type that are allocated to the different DCI may alternatively be used to implicitly indicate power control parameters corresponding to services with different reliability.

It should be noted that, in this embodiment, the RNTI field is used to implicitly indicate the path loss compensation factor, the target signal-to-noise ratio that is used when the network device receives the data from the terminal device, or the power scaling factor.

In the foregoing manner, the power control parameter and the value corresponding to the power control parameter are implicitly indicated by using the RNTI field in the DCI. In this way, an original field in the DCI field can be reused, and a new field does not need to be added to indicate the power control parameter and the value corresponding to the power control parameter, thereby saving signaling resources.

In a fifth manner, a redundancy version field in the DCI is used to implicitly indicate a power control parameter and a value corresponding to the power control parameter.

Specifically, the redundancy version field in the DCI includes two bits, and is used to indicate a redundancy version of a scheduled resource. In this manner, the redundancy version field may be used to implicitly indicate a power control parameter and a value corresponding to the power control parameter. In an actual application, a power control parameter and a value corresponding to the power control parameter may be indicated by using the following two methods:

(i) A bit in the redundancy version field is reused to indicate the value of the power control parameter. If one bit in the redundancy version field is reused, when a value of the bit is set to 1, it indicates that the power control parameter is the path loss compensation factor $\alpha$ and the target signal-to-noise ratio P0 that is used when the network device receives the data from the terminal device, where a is 1 and P0 is 5, that is, it indicates a value of a power control parameter that corresponds to a service whose reliability is greater than the preset threshold; or when a value of the bit is set to 0, it indicates that the power control parameter is the path loss compensation factor α and the target signal-to-noise ratio P0 that is used when the network device receives the data from the terminal device, where a is 0.5 and P0 is 5, that is, it indicates a value of a power control parameter that corresponds to a service whose reliability is less than the preset threshold. Certainly, two bits in the redundancy version field may alternatively be reused. For example, four values 00, 01, 10, and 11 may be respectively used to indicate values of a power control parameter that correspond to four different reliability.

(2) An original function of the redundancy version field is used to implicitly indicate values of a power control parameter that correspond to services with different reliability. For example, when a value of the redundancy version field is equal to 0, it indicates that a power control parameter indicating a high power is required; or when a value of the redundancy version field is not equal to 0, it indicates that a power control parameter indicating a low power is required. To be specific, when there are a relatively large quantity of redundancy versions, it indicates that reliability of a service that needs to be transmitted is relatively high. Therefore, a redundancy version needs to be added to improve interference resistance. In this case, the redundancy version field may implicitly indicate a value of a power control parameter that corresponds to a service whose reliability is greater than the preset threshold, for example, indicate that the power control parameter is the path loss compensation factor α and the target signal-to-noise ratio P0 that is used when the network device receives the data from the terminal device, where a is 1 and P0 is 5. When there are a relatively small quantity of redundancy versions, the redundancy version field implicitly indicates a value of a power control parameter that corresponds to a service whose reliability is less than the preset threshold, for example, indicates that the power control parameter is the path loss compensation factor α and the target signal-to-noise ratio P0 that is used when the network device receives the data from the terminal device, where a is 0.5 and P0 is 5.

It should be noted that two bits in the redundancy version field may alternatively be used to indicate a plurality of groups of values of a power control parameter. For example, four values 00, 01, 10, and 11 may be respectively used to indicate values of a power control parameter that correspond to four different reliability.

It should be noted that the redundancy version field may be used to indicate the path loss compensation factor, the target signal-to-noise ratio that is used when the network device receives the data from the terminal device, or the power scaling factor.

In the foregoing implementation, the power control parameter and the value corresponding to the power control parameter are implicitly indicated by using the redundancy version field in the DCI. In this way, an original field in the DCI field can be reused, and a new field does not need to be added to indicate the power control parameter and the value corresponding to the power control parameter, thereby saving signaling resources.

In a sixth manner, a carrier indicator field in the DCI is used to implicitly indicate a power control parameter and a value corresponding to the power control parameter.

Specifically, the carrier indicator field in the DCI includes three bits, and is used to indicate a carrier occupied by a scheduled resource. In this manner, the carrier indicator field may be used to implicitly indicate a power control parameter and a value corresponding to the power control parameter. In an actual application, a power control parameter and a value corresponding to the power control parameter may be indicated by using the following method:

A bit in the carrier indicator field is reused to indicate a value of a power control parameter. If one bit in the carrier indicator field is reused, when a value of the bit is set to 1, it indicates that the power control parameter is the path loss compensation factor α and the target signal-to-noise ratio P0 that is used when the network device receives the data from the terminal device, where a is 1 and P0 is 5, that is, it indicates a value of a power control parameter that corresponds to a service whose reliability is greater than the preset threshold; or when a value of the bit is set to 0, it indicates that the power control parameter is the path loss compensation factor α and the target signal-to-noise ratio P0 that is used when the network device receives the data from the terminal device, where a is 0.5 and P0 is 5, that is, it indicates a value of a power control parameter that corresponds to a service whose reliability is less than the preset threshold. Certainly, a plurality of bits in the carrier indicator field may alternatively be reused. For example, when two bits are reused, four values 00, 01, 10, and 11 may be respectively used to indicate values of a power control parameter that correspond to four different reliability. Certainly, three bits in the carrier indicator field may alternatively be reused to indicate values of a power control parameter that correspond to more reliability degrees.

It should be noted that the carrier indicator field may be used to indicate the path loss compensation factor, the target signal-to-noise ratio that is used when the network device receives the data from the terminal device, or the power scaling factor.

In the foregoing implementation, the power control parameter and the value corresponding to the power control parameter are implicitly indicated by using the carrier indicator field in the DCI. In this way, an original field in the DCI field can be reused, and a new field does not need to be added to indicate the power control parameter and the value corresponding to the power control parameter, thereby saving signaling resources.

In a seventh manner, an uplink channel (UL)/supplementary uplink (SUL) indicator field in the DCI is used to implicitly indicate a power control parameter and a value corresponding to the power control parameter.

Specifically, the UL/SUL indicator field in the DCI includes one bit, used to indicate whether an uplink or a supplementary uplink is used. In this manner, the UL/SUL indicator field in the DCI may be used to implicitly indicate a power control parameter and a value corresponding to the power control parameter. In an actual application, a power control parameter and a value corresponding to the power control parameter may be indicated by using the following two methods:

(1) A bit in the UL/SUL indicator field is reused to indicate a power control parameter and a value corresponding to the power control parameter. If one bit in the UL/SUL indicator field is reused, when a value of the bit is set to 1, it indicates that the power control parameter is the path loss compensation factor α and the target signal-to-noise ratio P0 that is used when the network device receives the data from the terminal device, where a is 1 and P0 is 5, that is, it indicates a value of a power control parameter that corresponds to a service whose reliability is greater than the preset threshold; or when a value of the bit is set to 0, it indicates that the power control parameter is the path loss compensation factor α and the target signal-to-noise ratio P0 that is used when the network device receives the data from the terminal device, where a is 0.5 and P0 is 5, that is, it indicates a value of a power control parameter that corresponds to a service whose reliability is less than the preset threshold.

(2) An original function of the UL/SUL indicator field is used to implicitly indicate values of a power control parameter that correspond to services with different reliability. For example, when the UL/SUL indicator field indicates that the UL is used, it indicates that a service type may be a common uplink service in long term evolution (LTE), and a reliability requirement of the service is not high. In this case, the UL/SUL indicator field may be used to implicitly indicate a value of a power control parameter that corresponds to a service whose reliability is less than the preset threshold, for example, indicate that the power control parameter includes the path loss compensation factor α and the target signal-to-noise ratio P0 that is used when the network device receives the data from the terminal device, where the value of a is 0.5 and the value of P0 is 5. When the UL/SUL indicator field indicates that the SUL is used, a service type may be an uplink service in NR non-standalone (NSA) or standalone (SA), and a reliability requirement of the service is relatively high. In this case, the UL/SUL indicator field may be used to implicitly indicate a value of a power control parameter that corresponds to a service whose reliability is greater than the preset threshold, for example, indicate that the power control parameter includes the path loss compensation factor α and the target signal-to-noise ratio P0 that is used when the network device receives the data from the terminal device, where the value of a is 1 and the value of P0 is 5.

It should be noted that the UL/SUL indicator field may further be used to indicate the path loss compensation factor, the target signal-to-noise ratio that is used when the network device receives the data from the terminal device, or the power scaling factor.

In the foregoing implementation, the power control parameter and the value corresponding to the power control parameter are implicitly indicated by using the UL/SUL indicator field in the DCI. In this way, an original field in the DCI field can be reused, and a new field does not need to be added to indicate the power control parameter and the value corresponding to the power control parameter, thereby saving signaling resources.

In an eighth manner, a bandwidth part (BWP) indicator field in the DCI is used to implicitly indicate a power control parameter and a value corresponding to the power control parameter.

Specifically, the BWP indicator field in the DCI includes zero bits, one bit, or two bits, and is used to indicate that different BWPs are used. In this manner, the BWP indicator field may be used to implicitly indicate a power control parameter and a value corresponding to the power control parameter. In an actual application, a power control parameter and a value corresponding to the power control parameter may be indicated by using the following two methods:

(1) A bit in the BWP indicator field is reused to indicate a power control parameter and a value corresponding to the power control parameter. If one bit in the BWP indicator field is reused, when a value of the bit is set to 1, it indicates that the power control parameter is the path loss compensation factor α and the target signal-to-noise ratio P0 that is used when the network device receives the data from the terminal device, where a is 1 and P0 is 5, that is, it indicates a value of a power control parameter that corresponds to a service whose reliability is greater than the preset threshold; or when a value of the bit is set to 0, it indicates that the power control parameter is the path loss compensation factor α and the target signal-to-noise ratio P0 that is used when the network device receives the data from the terminal device, where a is 0.5 and P0 is 5, that is, it indicates a value of a power control parameter that corresponds to a service whose reliability is less than the preset threshold. Certainly, two bits in the BWP indicator field may alternatively be reused, and four values 00, 01, 10, and 11 may be respectively used to indicate values of a power control parameter that correspond to four different reliability.

(2) An original function of the BWP indicator field is used to implicitly indicate values of a power control parameter that correspond to services with different reliability. For example, when the BWP indicator field indicates some BWPs, reliability requirements on the BWPs are not high. In this case, the BWP indicator field may implicitly indicate a value of a power control parameter that corresponds to a service whose reliability is less than the preset threshold, for example, indicate that the power control parameter is the path loss compensation factor α and the target signal-to-noise ratio P0 that is used when the network device receives the data from the terminal device, where a is 0.5 and P0 is 5. When the BWP indicator field indicates another BWP, the BWP indicator field may implicitly indicate a value of a power control parameter that corresponds to a service whose reliability is greater than the preset threshold, for example, indicate that the power control parameter is the path loss compensation factor α and the target signal-to-noise ratio P0 that is used when the network device receives the data from the terminal device, where a is 1 and P0 is 5.

It should be noted that the BWP indicator field may further be used to indicate the path loss compensation factor, the target signal-to-noise ratio that is used when the network device receives the data from the terminal device, or the power scaling factor.

In the foregoing implementation, the power control parameter and the value corresponding to the power control parameter are implicitly indicated by using the BWP indicator field in the DCI. In this way, an original field in the DCI field can be reused, and a new field does not need to be added to indicate the power control parameter and the value corresponding to the power control parameter, thereby saving signaling resources.

In a ninth manner, a frequency hopping (eFH) flag field in the DCI is used to implicitly indicate a power control parameter and a value corresponding to the power control parameter.

Specifically, the FH flag field in the DCI includes one bit, and is used to indicate whether frequency hopping occurs in an uplink scheduled resource. In this manner, the FH flag field may be used to implicitly indicate a power control parameter and a value corresponding to the power control parameter. In an actual application, a power control parameter and a value corresponding to the power control parameter may be indicated by using the following two methods:

(i) One bit in the FH flag field is reused to indicate a power control parameter and a value corresponding to the power control parameter. If one bit in the FH flag field is reused, when a value of the bit is set to 1, it indicates that the power control parameter is the path loss compensation factor α and the target signal-to-noise ratio P0 that is used when the network device receives the data from the terminal device, where a is 1 and P0 is 5, that is, it indicates a value of a power control parameter that corresponds to a service whose reliability is greater than the preset threshold; or when a value of the bit is set to 0, it indicates that the power control parameter is the path loss compensation factor α and the target signal-to-noise ratio P0 that is used when the network device receives the data from the terminal device, where a is 0.5 and P0 is 5, that is, it indicates a value of a power control parameter that corresponds to a service whose reliability is less than the preset threshold.

(2) An original function of the FH flag field is used to implicitly indicate values of a power control parameter that correspond to services with different reliability. If the FH flag field is set to 0, it indicates that frequency hopping is not required. A service sent on a same frequency band has a relatively high probability of being interfered with, and a reliability requirement of the service may be not high. Therefore, when the FH flag field is set to 0, the FH flag field may implicitly indicate a value of a power control parameter that corresponds to a service whose reliability is less than the preset threshold, for example, indicate that the power control parameter is the path loss compensation factor α and the target signal-to-noise ratio P0 that is used when the network device receives the data from the terminal device, where a is 0.5 and P0 is 5. When the FH flag field is set to 1, it indicates that frequency hopping is required. Sending a service on different frequency bands can avoid various types of interference within one frequency band to some extent. This type of service may have a relatively high reliability requirement. Therefore, when the FH flag field is set to 1, the FH flag field may implicitly indicate a value of a power control parameter that corresponds to a service whose reliability is greater than the preset threshold, for example, indicate that the power control parameter is the path loss compensation factor α and the target signal-to-noise ratio P0 that is used when the network device receives the data from the terminal device, where a is 1 and P0 is 5.

It should be noted that the FH flag field may further be used to indicate the path loss compensation factor, the target signal-to-noise ratio that is used when the network device receives the data from the terminal device, or the power scaling factor.

In the foregoing implementation, the power control parameter and the value corresponding to the power control parameter are implicitly indicated by using the FH flag field in the DCI. In this way, an original field in the DCI field can be reused, and a new field does not need to be added to indicate the power control parameter and the value corresponding to the power control parameter, thereby saving signaling resources.

Further, the DCI in the foregoing indication manners includes terminal-specific DCI (UE-specific DCI) or group common DCI.

In a tenth manner, a power control adjustment state variable (TCP command field) of a PUSCH in the DCI is used to implicitly indicate a power control parameter and a value corresponding to the power control parameter.

Specifically, the TCP command field in the DCI includes two bits. In this manner, the TCP command field may be used to implicitly indicate a power control parameter and a value corresponding to the power control parameter. In an actual application, a power control parameter and a value corresponding to the power control parameter may be indicated by using the following method:

A bit in the TCP command field is reused to indicate a value of a power control parameter. If one bit in the TCP command field is reused, when a value of the bit is set to 1, it indicates that the power control parameter is the path loss compensation factor α and the target signal-to-noise ratio P0 that is used when the network device receives the data from the terminal device, where a is 1 and P0 is 5, that is, it indicates a value of a power control parameter that corresponds to a service whose reliability is greater than the preset threshold; or when a value of the bit is set to 0, it indicates that the power control parameter is the path loss compensation factor α and the target signal-to-noise ratio P0 that is used when the network device receives the data from the terminal device, where a is 0.5 and P0 is 5, that is, it indicates a value of a power control parameter that corresponds to a service whose reliability is less than the preset threshold. Certainly, two bits in the TCP command field may alternatively be reused. For example, four values 00, 01, 10, and 11 may be respectively used to indicate values of a power control parameter that correspond to four different reliability.

It should be noted that two bits in the TCP command field may alternatively be used to indicate a plurality of groups of values of a power control parameter. For example, four values 00, 01, 10, and 11 may be respectively used to indicate values of a power control parameter that correspond to four different reliability.

It should be noted that the TCP command field may be used to indicate the path loss compensation factor, the target signal-to-noise ratio that is used when the network device receives the data from the terminal device, or the power scaling factor.

In the foregoing implementation, the power control parameter and the value corresponding to the power control parameter are implicitly indicated by using the TCP command field in the DCI. In this way, an original field in the DCI field can be reused, and a new field does not need to be added to indicate the power control parameter and the value corresponding to the power control parameter, thereby saving signaling resources.

Step 203: The terminal adjusts the transmit power based on the value of the power control parameter.

In this step, after determining the value of the power control parameter based on the indication information, the terminal adjusts the transmit power for the uplink information based on the value.

In a possible implementation, the power control parameter includes the power scaling factor. When performing power adjustment, the terminal device multiplies the transmit power by the scaling factor, to obtain an adjusted transmit power.

Using a PUSCH as an example, it can be learned from the formula (1) that the terminal may adjust the transmit power by adjusting a value of at least one parameter of the path loss compensation factor $\alpha_{f,c}$, the target signal-to-noise ratio $P_{0\_PUSCH_{f,c}}$ that is used when the network device receives the data from the terminal device, the absolute power correction value, or the accumulated power correction value.

In addition, the uplink information may include the PUSCH, a PUCCH, or an SRS.

Specifically, a power control formula of the SRS is shown in a formula (2):

$$P_{SRS,f,c}(i, q_s, l) = \min\begin{Bmatrix} P_{CMAX,f,c}(i), \\ P_{0\_SRS,f,c}(q_s) + 10 \log_{10}(2^\mu \cdot M_{SRS,f,c}(i)) + \\ \alpha_{SRS,f,c}(q_s) \cdot PL_{f,c}(q_s) + h_{f,c}(i, l) \end{Bmatrix} \quad (2)$$

where c is a serving cell, i is a transmission period of the SRS, $q_s$ is an SRS resource set, l is a power control adjustment state index, $P_{SRS,f,c}$ is a transmit power for the SRS in the serving cell, $P_{CMAX,f,c}$ is a maximum transmit power that is allowed by the terminal device on a carrier and in the serving cell, $P_{O\_SRS,f,c}$ is a target signal-to-noise ratio that is used when the network device receives data from the terminal device, $M_{SRS,f,c}$ is resource allocation bandwidth indication information of the SRS in the serving cell, $\alpha_{SRS,f,c}$ is a path loss compensation factor, $PL_{f,c}$ is a path loss value, $h_{f,c}$ is a closed-loop power control adjustment state, where $h_{f,c}(i,l)=h_{f,c}(i-1,l)+\delta_{SRS,f,c}(i-K_{SRS},l)$, $\delta_{SRS,f,c}$ is an absolute power correction value or an accumulated power correction value, $i-K_{SRS}$ is a subframe number for sending $\delta_{SRS,f,c}$, and $\mu$ is a subcarrier spacing and a cyclic prefix number.

Therefore, a person skilled in the art may understand that, based on the formula (i) and the formula (2), it can be learned that all the methods for adjusting and determining the value of the power control parameter may be applicable to the PUSCH and the SRS.

In addition, a power control formula of the PUCCH is shown in a formula (3):

$$P_{PUCCH,f,c}(i, q_u, q_d, l) = \min\left\{\begin{array}{l} P_{CMAX,f,c}(i), \\ P_{O\_PUCCH,f,c}(q_u) + PL_{f,c}(q_d) + \\ \Delta_{F\_PUCCH}(F) + \Delta_{TF,f,c}(i) + g_{f,c}(i, l) \end{array}\right\} \quad (3)$$

where c is a serving cell, i is a transmission period of the PUCCH, $q_u$ is identification information of the power control parameter, l is a power control adjustment state index, $P_{PUCCH,f,c}$ is a transmit power for the PUCCH in the serving cell, $P_{CMAX,f,c}$ is a maximum transmit power that is allowed by the terminal device on a carrier and in the serving cell, $P_{O\_PUCCH,f,c}$ is a target signal-to-noise ratio that is used when the network device receives data from the terminal device, $PL_{f,c}$ is a path loss value, $q_d$ is a reference signal resource used by the terminal device, $\Delta_{TF,f,c}$ is a modulation scheme offset, $g_{f,c}$ is a closed-loop power control adjustment state, where $g_{f,c}(i,l)=g_{f,c}(i-1,l)+\delta_{PUCCH,f,c}(i-K_{PUCCH},l)$, $\delta_{PUCCH,f,c}$ is an absolute power correction value or an accumulated power correction value, and $i-K_{PUCCH}$ is a subframe number for sending $\delta_{PUCCH,f,c}$.

It can be learned from the formula (3) that, it may be considered that the path loss compensation factor is set to 1 and cannot be changed. Therefore, for the PUCCH, the determined value of the power control parameter does not include the value of the path loss compensation factor.

Step 204: The terminal device sends the uplink information at the adjusted transmit power.

In this step, after adjusting the transmit power based on the value of the power control parameter, the terminal device sends the uplink information at the adjusted transmit power.

This embodiment of this application provides the uplink information transmission method. The network device determines the value of the power control parameter in the value set of the power control parameter, where any value set of the power control parameter includes at least two values; then sends the indication information to the terminal device, where the indication information is used to indicate the value of the power control parameter; and receives the uplink information, where the uplink information is sent by the terminal device at the transmit power adjusted based on the value of the power control parameter. The network device may determine the value of the power control parameter in the value set including the at least two values, and indicate the determined value of the power control parameter to the terminal device, so that the terminal device adjusts the transmit power for the uplink information based on the determined value of the power control parameter. In this way, the network device may select different values of the power control parameter based on different reliability of transmission services, to further meet requirements of the services with the different reliability, so that a requirement on an operating point change corresponding to the transmission services with the different reliability can be met.

Figure 3:
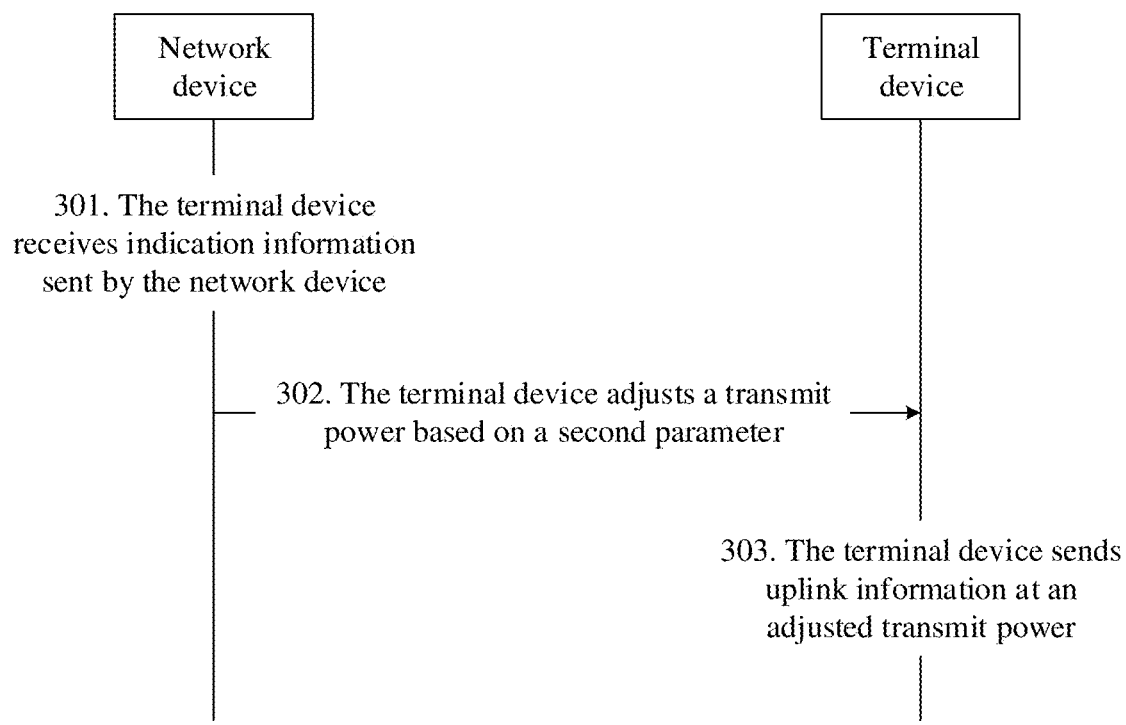
FIG. 3 is another signaling flowchart of an uplink information transmission method according to this application.

FIG. 3 is another signaling flowchart of an uplink information transmission method according to this application. Based on the system architecture shown in FIG. 1, as shown in FIG. 3, the method in this embodiment may include the following steps.

Step 3o1: The terminal device receives indication information from the network device.

The indication information is used to indicate a second parameter, the second parameter includes an accumulated power correction value or an absolute power correction value, and the indication information is carried in DCI.

In this step, after determining the accumulated power correction value or the absolute power correction value, the network device sends the indication information to the terminal device, to indicate the determined accumulated power correction value or absolute power correction value.

Step 302: The terminal device adjusts a transmit power based on the second parameter.

In this step, after receiving the indication information, the terminal device adjusts the transmit power for uplink information based on the accumulated power correction value or the absolute power correction value indicated by the indication information.

Step 303: The terminal device sends the uplink information at an adjusted transmit power.

In this step, after adjusting the transmit power based on the second parameter, the terminal device sends the uplink information based on the adjusted transmit power.

In a possible implementation, the terminal device may adjust the transmit power based on only the accumulated power correction value or the absolute power correction value.

In addition, in another possible implementation, before the adjusting, by the terminal device, a transmit power based on the second parameter, the method further includes: determining, by the terminal device, power control identification information, where the power control identification information is used to identify a first parameter, and the first parameter includes a path loss compensation factor and/or a target signal-to-noise ratio that is used when the network device receives data from the terminal device; and correspondingly, the adjusting a transmit power based on the second parameter includes adjusting the transmit power based on the second parameter and the first parameter.

Specifically, after adjusting the transmit power based on the accumulated power correction value or the absolute power correction value, if the terminal device finds that the adjusted transmit power does not meet a requirement for sending the uplink information, the terminal device further determines the power control identification information. The power control identification information is used to identify the first parameter. The terminal device adjusts the transmit power based on the second parameter and the first parameter together. The first parameter includes the path loss compensation factor and/or the target signal-to-noise ratio that is used when the network device receives the data from the terminal device.

In a possible implementation, the terminal device may adjust the transmit power based on the second parameter and the first parameter together, so that the adjusted transmit power can meet a requirement on an operating point change corresponding to transmission services.

Further, the terminal device may determine the power control identification information in the following plurality of manners. For example, the network device may send DCI to the terminal device, and indicate the power control identification information to the terminal device by using the DCI; or the network device may send higher layer signaling to the terminal device, and indicate the power control identification information to the terminal device by using the higher layer signaling; or the terminal device may determine the power control identification information based on received data or information, for example, determine the power control identification information based on whether a type of the received DCI is fallback DCI or non-fallback DCI. A specific manner in which the terminal determines the power control identification information is not limited in this embodiment of this application.

In addition, a PUSCH is used as an example. In the formula (i), j is identification information of a power control parameter, namely, the power control identification information. Different values of j correspond to different values of power control parameter. For example, when j is equal to 0, the corresponding path loss compensation factor $\alpha$ is 0.5, and the target signal-to-noise ratio $P_0$ that is used when the network device receives the data from the terminal device is 5; or when j is equal to 1, the corresponding path loss compensation factor $\alpha$ is 1, and the target signal-to-noise ratio $P_0$ that is used when the network device receives the data from the terminal device is 5; or when j is equal to 2, the corresponding path loss compensation factor $\alpha$ is 0.8, and the target signal-to-noise ratio $P_0$ that is used when the network device receives the data from the terminal device is 3.

After determining the value of j, the terminal may determine a value of the first parameter, namely, a value of the path loss compensation factor $\alpha$ and/or a value of the target signal-to-noise ratio $P_0$ that is used when the network device receives the data from the terminal device, so that the terminal adjusts the transmit power based on the second parameter and the first parameter.

In addition, in a possible implementation, when the DCI is the fallback DCI (fallback DCI), the power control identification information is first power control identification information, and the first power control identification information is used to identify a first path loss compensation factor and/or a first signal-to-noise ratio that is used when the network device receives data from the terminal device; or when the DCI is the non-fallback DCI, the power control identification information is second power control identification information, and the second power control identification information is used to identify a second path loss compensation factor and/or a second target signal-to-noise ratio that is used when the network device receives data from the terminal device, where the first power control identification information is different from the second power control identification information.

Specifically, the indication information sent by the network device to the terminal device is carried in the DCI. When the DCI sent by the network device to the terminal device is the fallback DCI, the power control identification information is the first power control identification information, and the first path loss compensation factor and/or the first target signal-to-noise ratio that is used when the network device receives the data from the terminal device that are/is identified by the first power control identification information are/is not configurable. In a possible implementation, the first power control identification information j may be equal to 0. To be specific, when the DCI is the fallback DCI, the first parameter is the first path loss compensation factor corresponding to the power control identification information j being 0 and/or the first target signal-to-noise ratio that is used when the network device receives the data from the terminal device. For example, $\alpha$ may be equal to 0.5 and $P_0$ may be equal to 5.

In another possible implementation, when the DCI is the fallback DCI, the power control identification information is the first power control identification information, and the first path loss compensation factor and/or the first target signal-to-noise ratio that is used when the network device receives the data from the terminal device that are/is identified by the first power control identification information are/is predefined or predetermined; or may be a broadcast path loss compensation factor and/or a broadcast signal-to-noise ratio.

Further, when the DCI is the fallback DCI, the first path loss compensation factor and/or the first target signal-to-noise ratio that is used when the network device receives the data from the terminal device that are/is identified by the first power control identification information may alternatively be default values or a default value.

In addition, a preamble transmit power may alternatively be used as the target signal-to-noise ratio that is used when the network device receives the data from the terminal device.

When the DCI is the non-fallback DCI, the power control identification information is the second power control identification information. Optionally, the second power control identification information j is not equal to 0. To be specific, when the DCI is the non-fallback DCI, the first parameter is the second path loss compensation factor and/or the second target signal-to-noise ratio that correspond/corresponds to j being not equal to 0, for example, the second path loss compensation factor and/or the second target signal-to-noise ratio that correspond/corresponds to j being equal to 1, or the second path loss compensation factor and/or the second target signal-to-noise ratio that correspond/corresponds to j being equal to 2.

It can be learned from the foregoing descriptions that, the power control identification information included in the fallback DCI is different from the power control identification information included in the non-fallback DCI, that is, the first power control identification information is different from the second power control identification information.

Further, the first path loss compensation factor and the second path loss compensation factor are configured for the fallback DCI and the non-fallback DCI independently. Alternatively, the first target signal-to-noise ratio and the second target signal-to-noise ratio are independently configured for the fallback DCI and the non-fallback DCI independently.

Specifically, for the fallback DCI and the non-fallback DCI, the first path loss compensation factor and/or the first target signal-to-noise ratio that is used when the network device receives the data from the terminal device that are/is indicated by the first power control identification information, and the second path loss compensation factor and/or the second target signal-to-noise ratio that is used when the network device receives the data from the terminal device that are/is indicated by the second power control identification information have no relationship, that is, are independently configured.

Further, the first path loss compensation factor corresponding to the first power control identification information is different from the second path loss compensation factor corresponding to the second power control identification information. Alternatively, the first target signal-to-noise ratio corresponding to the first power control identification information is different from the second target signal-to-noise ratio corresponding to the second power control identification information.

In addition, it should be noted that when the DCI is the fallback DCI, the terminal device is in a non-radio resource control (RRC) signaling connected mode or an RRC connected mode. Alternatively, when the DCI is the non-fallback DCI, the terminal device is in an RRC connected mode.

Specifically, when the DCI is the fallback DCI, the terminal device may be in the non-RRC connected mode, or may be in the RRC connected mode. In other words, when the terminal device is switched from the non-RRC connected mode to the RRC connected mode, the terminal device may receive the fallback DCI from the network device. When the DCI is the non-fallback DCI, the terminal device can be only in the RRC connected mode.

Further, in the latest NR standard, the fallback DCI is represented by using a DCI format 0_0 and a DCI format 0_1. Differences between the fallback DCI and the non-fallback (non-fallback) DCI are as follows.

(1) A payload size of the fallback DCI cannot be configured, and a payload size of the non-fallback DCI can be configured.

(2) A quantity of DCI fields in the fallback DCI is less than a quantity of DCI fields in the non-fallback DCI. Therefore, some information is not sent in the fallback DCI. For example, the following information: a frequency hopping flag, an uplink sounding reference signal resource indicator, a physical resource block (PRB) bundling size indicator, a rate-matching indicator, a zero-forcing (ZP)-channel state information-reference signal (CSI-RS) trigger, code block group (CBG) flushing out indicator information, a CBG transmission indicator, and the like, are not sent by using the fallback DCI.

According to the uplink information transmission method provided in this embodiment of this application, the terminal device receives the indication information from the network device, where the indication information is used to indicate the second parameter, the second parameter includes the accumulated power correction value or the absolute power correction value, and the indication information is carried in the downlink control information DCI; adjusts the transmit power based on the second parameter; and then sends the uplink information at the adjusted transmit power. The network device indicates the second parameter to the terminal device, so that the terminal device adjusts the transmit power for the uplink information based on the indicated second parameter. In this way, the transmit power adjusted by the terminal device may meet requirements of services with different reliability, so that a requirement on an operating point change corresponding to the transmission services with the different reliability can be met.

Figure 4:
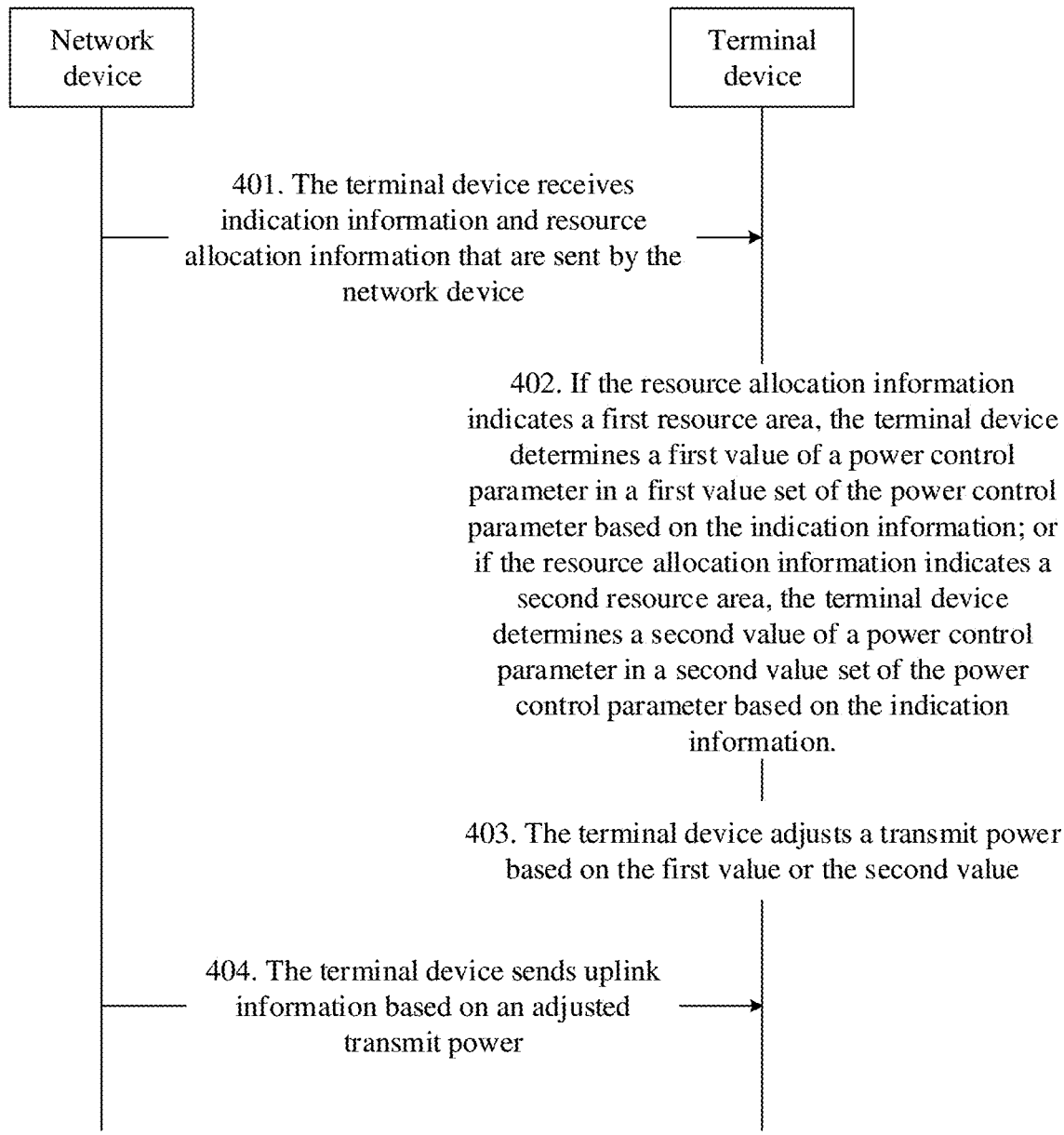
FIG. 4 is still another signaling flowchart of an uplink information transmission method according to this application.

FIG. 4 is still another signaling flowchart of an uplink information transmission method according to this application. Based on the system architecture shown in FIG. 1, as shown in FIG. 4, the method in this embodiment may include the following steps.

Step 401: The terminal device receives indication information and resource allocation information from the network device.

The indication information is used to instruct to determine a value of a power control parameter in a value set of the power control parameter, and the resource allocation information is used to indicate a resource area.

In a possible implementation, the network device configures a group of values of the power control parameter for a grant free resource, and configures a group of values of the power control parameter for a grant based resource. A value of the power control parameter that corresponds to the grant free resource and a value of the power control parameter that corresponds to the grant based resource are independently configured.

The terminal device receives the resource allocation information from the network device, to determine that service data is sent in a grant free resource area or a grant based resource area.

Step 402: If the resource allocation information indicates a first resource area, the terminal device determines a first value of the power control parameter in a first value set of the power control parameter based on the indication information; or if the resource allocation information indicates a second resource area, the terminal device determines a second value of the power control parameter in a second value set of the power control parameter based on the indication information.

The first value set includes at least two values, and the second value set includes at least two values.

In a possible implementation, after determining that the service data is sent in the grant free resource area or is sent in the grant based resource area, the terminal device determines the value of the power control parameter based on the resource area in which the service data is sent. Specifically, if the resource allocation information indicates the first resource area, the terminal device determines the first value of the power control parameter in the first value set of the power control parameter based on the indication information, and the first value set is a value set of the power control parameter that corresponds to the first resource area. If the resource allocation information indicates the second resource area, the terminal device determines the second value of the power control parameter in the second value set of the power control parameter based on the indication information, and the second value set is a value set of the power control parameter that corresponds to the second resource area. The first resource area may be a grant free resource area, and the second resource area may be a grant based resource area; or the first resource area may be a grant based resource area, and the second resource area may be a grant free resource area.

For example, if the terminal device sends data in a grant free resource area, the terminal device selects a value of power control parameter from a value set of the power control parameter value set that is configured by the network device for the grant free resource area; or if the terminal device sends data in a grant based resource area, the terminal device selects a power control parameter from a value set of the power control parameter value set configured by the network device for the grant based resource area.

In addition, processes of determining the power control parameter, the value set of the power control parameter, and the value of the power control parameter are similar to those in the foregoing embodiments, and details are not described herein again.

Step 403: The terminal device adjusts a transmit power based on the first value or the second value.

In this step, after determining the first value or the second value, the terminal device adjusts the transmit power based on the determined first value or second value. A specific adjustment process is similar to that in the foregoing embodiments, and details are not described herein again.

Step 404: The terminal device sends uplink information based on an adjusted transmit power.

In this step, after adjusting the transmit power based on the determined first value or second value, the terminal device sends the uplink information based on the adjusted transmit power.

According to the uplink information transmission method provided in this embodiment of this application, the terminal device receives the indication information and the resource allocation information from the network device, and if the resource allocation information indicates the first resource area, the terminal device determines the first value of the power control parameter in the first value set of the power control parameter based on the indication information; or if the resource allocation information indicates the second resource area, the terminal device determines the second value of the power control parameter in the second value set of the power control parameter based on the indication information, where the first value set includes at least two values, and the second value set includes at least two values; the terminal device adjusts the transmit power based on the first value or the second value; and the terminal device sends the uplink information based on the adjusted transmit power. Because different resource areas may be scheduled for the terminal device, an independent value of the power parameter may be used to adjust the transmit power. In this way, resources can be more efficiently reused for another terminal in a different resource area.

Figure 5:
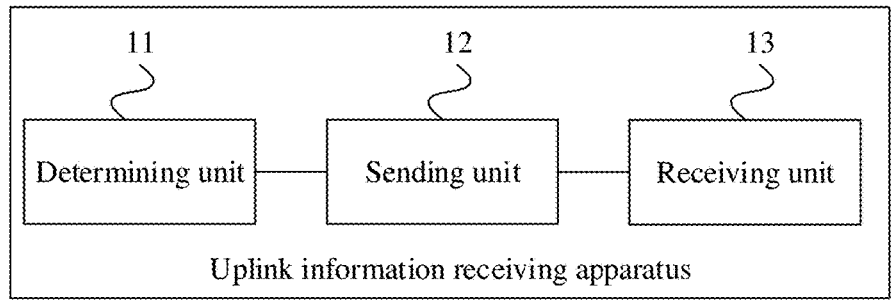
FIG. 5 is a schematic structural diagram of an uplink information receiving apparatus according to an embodiment of this application.

FIG. 5 is a schematic structural diagram of an uplink information receiving apparatus according to an embodiment of this application. Referring to FIG. 5, the apparatus includes a determining unit 11, a sending unit 12, and a receiving unit 13.

The determining unit 11 is configured to determine a value of a power control parameter in a value set of the power control parameter, where any value set of the power control parameter includes at least two values.

The sending unit 12 is configured to send indication information to a terminal device, where the indication information is used to indicate the value of the power control parameter.

The receiving unit 13 is configured to receive uplink information, where the uplink information is sent by the terminal device at a transmit power adjusted based on the value of the power control parameter.

The uplink information receiving apparatus provided in this embodiment of this application may execute the foregoing corresponding method embodiment. An implementation principle and a technical effect of the apparatus embodiment are similar to those of the foregoing method embodiment, and details are not described herein again.

Optionally, the power control parameter includes at least one of an accumulated power correction value, an absolute power correction value, and a first parameter, and the first parameter includes at least one of the following information: a path loss compensation factor; a target signal-to-noise ratio that is used when a network device receives data from the terminal device; and a power scaling factor.

Optionally, the power control parameter includes the accumulated power correction value, and a maximum value of the accumulated power correction value is 5, 6, 7, or 10.

Optionally, the power control parameter includes the accumulated power correction value, and a minimum value of the accumulated power correction value is −3, −5, or −6.

Optionally, the power control parameter includes the absolute power correction value, and a maximum value of the absolute power correction value is 8, 9, 12, or 16.

Optionally, the power control parameter includes the absolute power correction value, and a minimum value of the absolute power correction value is −8, −9, −12, or −16.

Optionally, the power control parameter includes the accumulated power correction value, and the accumulated power correction value is −2, 0, 2, or 5; or the accumulated power correction value is −2, 0, 2, or 6.

Optionally, the power control parameter includes the absolute power correction value, and the absolute power correction value is −7, −2, 2, or 7; or the absolute power correction value is −6, −1, 1, or 6; or the absolute power correction value is −8, −2, 2, or 8.

Optionally, the power control parameter includes the accumulated power correction value and/or the absolute power correction value, and a value set of the accumulated power correction value and/or a value set of the absolute power correction value are/is configured by using higher layer signaling.

Optionally, the indication information belongs to downlink control information DCI.

Optionally, the DCI includes terminal-specific DCI or group user common DCI.

The uplink information receiving apparatus provided in this embodiment of this application may execute the foregoing corresponding method embodiment. An implementation principle and a technical effect of the apparatus embodiment are similar to those of the foregoing method embodiment, and details are not described herein again.

It should be noted that, it should be understood that division of the units of the foregoing apparatus is merely logical function division, and in actual implementations, all or some of the units may be integrated into a physical entity, or the units may be physically separate. In addition, all of the units may be implemented in a form of software invoked by a processing element or in a form of hardware. Alternatively, some of the units may be implemented in a form of software invoked by a processing element, and some of the units may be implemented in a form of hardware. For example, the sending unit may be a processing element disposed independently, or may be integrated into a chip of the apparatus for implementation. In addition, the sending unit may alternatively be stored in a memory of the apparatus in a form of a program, and invoked by a processing element of the apparatus to perform the function of the sending unit. Implementations of other units are similar to the implementation of the sending unit. In addition, all or some of the units may be integrated together or may be independently implemented. The processing element may be an integrated circuit and has a signal processing capability. In an implementation process, the steps in the foregoing methods or the foregoing units can be implemented by using a hardware integrated logical circuit in the processing element, or by using instructions in a form of software. In addition, the sending unit is a unit that controls sending, and may send information by using a transmit apparatus, such as an antenna and a radio frequency apparatus, of the apparatus.

The foregoing units may be configured as one or more integrated circuits for performing the foregoing method, for example, one or more application-specific integrated circuits (ASIC), one or more microprocessors (DSP), or one or more field programmable gate arrays (FPGA). For another example, when one of the foregoing units is implemented in a form of a processing element invoking a program, the processing element may be a general-purpose processor, for example, a central processing unit (CPU) or another processor that can invoke a program. For another example, the units may be integrated together and implemented in a form of a system-on-a-chip (SOC).

Figure 6:
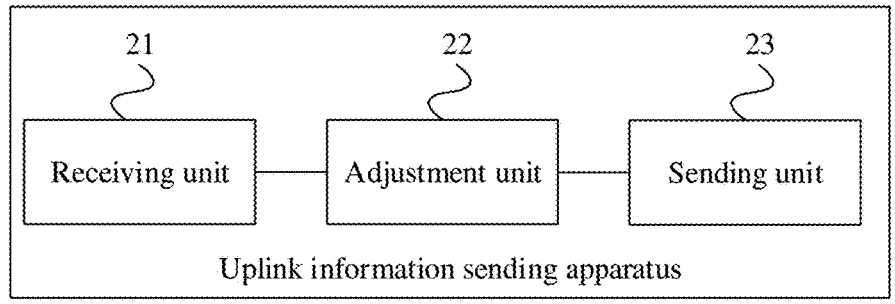
FIG. 6 is another schematic structural diagram of an uplink information sending apparatus according to an embodiment of this application.

FIG. 6 is another schematic structural diagram of an uplink information sending apparatus according to an embodiment of this application. Referring to FIG. 6, the apparatus includes a receiving unit 21, an adjustment unit 22, and a sending unit 23.

The receiving unit 21 is configured to receive indication information from a network device, where the indication information is used to indicate a value of a power control parameter, the value of the power control parameter is determined by the network device in a value set of the power control parameter, and any value set of the power control parameter includes at least two values.

The adjustment unit 22 is configured to adjust a transmit power based on the value of the power control parameter.

The sending unit 23 is configured to send uplink information at an adjusted transmit power.

The uplink information transmitting apparatus provided in this embodiment of this application may execute the foregoing corresponding method embodiment. An implementation principle and a technical effect of the apparatus embodiment are similar to those of the foregoing method embodiment, and details are not described herein again.

Optionally, the power control parameter includes at least one of an accumulated power correction value, an absolute power correction value, and a first parameter, and the first parameter includes at least one of the following information: a path loss compensation factor; a target signal-to-noise ratio that is used when the network device receives data from a terminal device; and a power scaling factor.

Optionally, the power control parameter includes the accumulated power correction value, and a maximum value of the accumulated power correction value is 5, 6, 7, or 10.

Optionally, the power control parameter includes the accumulated power correction value, and a minimum value of the accumulated power correction value is −3, −5, or −6.

Optionally, the power control parameter includes the absolute power correction value, and a maximum value of the absolute power correction value is 8, 9, 12, or 16.

Optionally, the power control parameter includes the absolute power correction value, and a minimum value of the absolute power correction value is −8, −9, −12, or −16.

Optionally, the power control parameter includes the accumulated power correction value, and the accumulated power correction value is −2, 0, 2, or 5; or the accumulated power correction value is −2, 0, 2, or 6.

Optionally, the power control parameter includes the absolute power correction value, and the absolute power correction value is −7, −2, 2, or 7; or the absolute power correction value is −6, −1, 1, or 6; or the absolute power correction value is −8, −2, 2, or 8.

Optionally, the power control parameter includes the accumulated power correction value and/or the absolute power correction value, and a value set of the accumulated power correction value and/or a value set of the absolute power correction value are/is configured by using higher layer signaling.

Optionally, the indication information belongs to downlink control information DCI.

Optionally, the DCI includes terminal-specific DCI or group user common DCI.

The uplink information transmitting apparatus provided in this embodiment of this application may execute the foregoing corresponding method embodiment. An implementation principle and a technical effect of the apparatus embodiment are similar to those of the foregoing method embodiment, and details are not described herein again.

It should be noted that, it should be understood that division of the units of the foregoing apparatus is merely logical function division, and in actual implementations, all or some of the units may be integrated into a physical entity, or the units may be physically separate. In addition, all of the units may be implemented in a form of software invoked by a processing element or in a form of hardware. Alternatively, some of the units may be implemented in a form of software invoked by a processing element, and some of the units may be implemented in a form of hardware. For example, the sending unit may be a processing element disposed independently, or may be integrated into a chip of the apparatus for implementation. In addition, the sending unit may alternatively be stored in a memory of the apparatus in a form of a program, and invoked by a processing element of the apparatus to perform the function of the sending unit. Implementations of other units are similar to the implementation of the sending unit. In addition, all or some of the units may be integrated together or may be independently implemented. The processing element may be an integrated circuit and has a signal processing capability. In an implementation process, the steps in the foregoing methods or the foregoing units can be implemented by using a hardware integrated logical circuit in the processing element, or by using instructions in a form of software. In addition, the sending unit is a unit that controls sending, and may send information by using a transmit apparatus, such as an antenna and a radio frequency apparatus, of the apparatus.

The foregoing units may be configured as one or more integrated circuits for performing the foregoing method, for example, one or more application-specific integrated circuits (ASIC), one or more microprocessors (DSP), or one or more field programmable gate arrays (FPGA). For another example, when one of the foregoing units is implemented in a form of a processing element invoking a program, the processing element may be a general-purpose processor, for example, a central processing unit (CPU) or another processor that can invoke a program. For another example, the units may be integrated together and implemented in a form of a system-on-a-chip (SOC).

Figure 7:
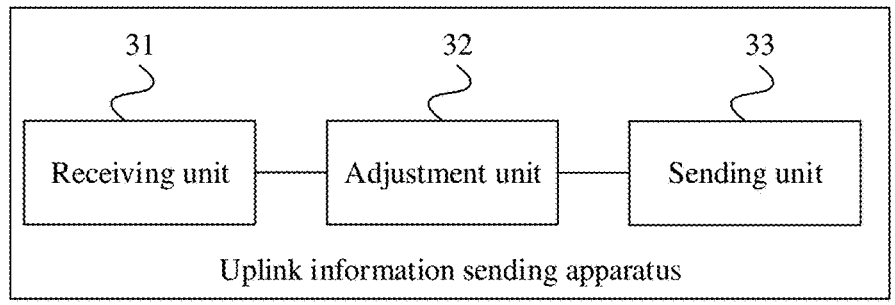
FIG. 7 is still another schematic structural diagram of an uplink information sending apparatus according to an embodiment of this application.

FIG. 7 is still another schematic structural diagram of an uplink information sending apparatus according to an embodiment of this application. Referring to FIG. 7, the apparatus includes a receiving unit 31, an adjustment unit 32, and a sending unit 33.

The receiving unit 31 is configured to receive indication information from a network device, where the indication information is used to indicate a second parameter, the second parameter includes an accumulated power correction value or an absolute power correction value, and the indication information is carried in downlink control information DCI.

The adjustment unit 32 is configured to adjust a transmit power based on the second parameter.

The sending unit 33 is configured to send uplink information at an adjusted transmit power.

The uplink information transmitting apparatus provided in this embodiment of this application may execute the foregoing corresponding method embodiment. An implementation principle and a technical effect of the apparatus embodiment are similar to those of the foregoing method embodiment, and details are not described herein again.

Figure 8:
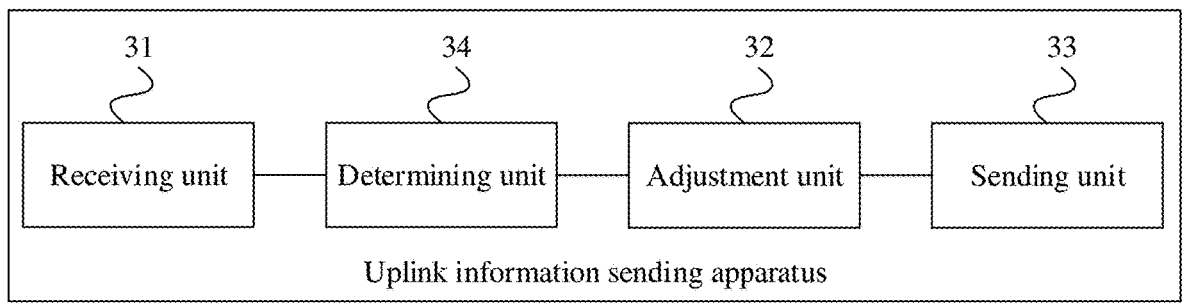
FIG. 8 is yet another schematic structural diagram of an uplink information sending apparatus according to an embodiment of this application.

FIG. 8 is yet another schematic structural diagram of an uplink information sending apparatus according to an embodiment of this application. Referring to FIG. 8, based on the embodiment shown in FIG. 7, the apparatus further includes a determining unit 34.

The determining unit 34 is configured to determine power control identification information, where the power control identification information is used to identify a first parameter, and the first parameter includes a path loss compensation factor and/or a signal-to-noise ratio that is used when the network device receives data from a terminal device; and the adjustment unit 32 is specifically configured to: adjust the transmit power based on the second parameter and the first parameter.

Optionally, when the DCI is fallback DCI, the power control identification information is first power control identification information, and the first power control identification information is used to identify a first path loss compensation factor and/or a first signal-to-noise ratio that is used when the network device receives data from the terminal device; or when the DCI is non-fallback DCI, the power control identification information is second power control identification information, and the second power control identification information is used to identify a second path loss compensation factor and/or a second signal-to-noise ratio that is used when the network device receives data from the terminal device, where the first power control identification information is different from the second power control identification information.

Optionally, the first path loss compensation factor and the second path loss compensation factor are independently configured; or the first signal-to-noise ratio and the second signal-to-noise ratio are independently configured.

Optionally, when the DCI is the fallback DCI, the terminal device is in a non-radio resource control RRC connected mode or an RRC connected mode; or when the DCI is the non-fallback DCI, the terminal device is in an RRC connected mode.

The uplink information transmitting apparatus provided in this embodiment of this application may execute the foregoing corresponding method embodiment. An implementation principle and a technical effect of the apparatus embodiment are similar to those of the foregoing method embodiment, and details are not described herein again.

It should be noted that, it should be understood that division of the units of the apparatus is merely logical function division, and in actual implementations, all or some of the units may be integrated into a physical entity, or the units may be physically separate. In addition, all of the units may be implemented in a form of software invoked by a processing element or in a form of hardware. Alternatively, some of the units may be implemented in a form of software invoked by a processing element, and some of the units may be implemented in a form of hardware. For example, the sending unit may be a processing element disposed independently, or may be integrated into a chip of the apparatus for implementation. In addition, the sending unit may alternatively be stored in a memory of the apparatus in a form of a program, and invoked by a processing element of the apparatus to perform the function of the sending unit. Implementations of other units are similar to the implementation of the sending unit. In addition, all or some of the units may be integrated together or may be independently implemented. The processing element may be an integrated circuit and has a signal processing capability. In an implementation process, the steps in the foregoing methods or the foregoing units can be implemented by using a hardware integrated logical circuit in the processing element, or by using instructions in a form of software. In addition, the sending unit is a unit that controls sending, and may send information by using a transmit apparatus, such as an antenna and a radio frequency apparatus, of the apparatus.

The foregoing units may be configured as one or more integrated circuits for performing the foregoing method, for example, one or more application-specific integrated circuits (ASIC), one or more microprocessors (DSP), or one or more field programmable gate arrays (FPGA). For another example, when one of the foregoing units is implemented in a form of a processing element invoking a program, the processing element may be a general-purpose processor, for example, a central processing unit (CPU) or another processor that can invoke a program. For another example, the units may be integrated together and implemented in a form of a system-on-a-chip (SOC).

Figure 9:
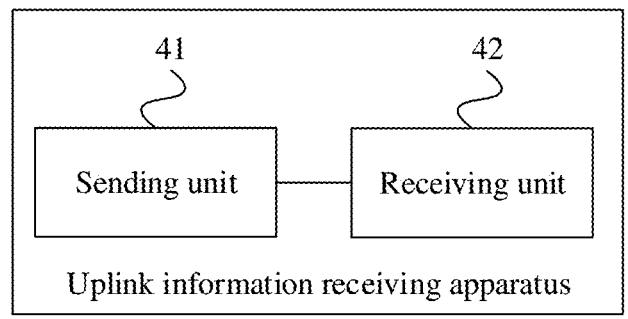
FIG. 9 is yet another schematic structural diagram of an uplink information receiving apparatus according to an embodiment of this application.

FIG. 9 is yet another schematic structural diagram of an uplink information receiving apparatus according to an embodiment of this application. Referring to FIG. 9, the apparatus includes a sending unit 41 and a receiving unit 42.

The sending unit 41 is configured to send indication information to a terminal device, where the indication information is used to indicate a second parameter, the second parameter includes an accumulated power correction value or an absolute power correction value, and the indication information is carried in downlink control information DCI.

The receiving unit 42 is configured to receive uplink information from the terminal device, where the uplink information is sent by the terminal device at a transmit power adjusted based on the second parameter.

The uplink information receiving apparatus provided in this embodiment of this application may execute the foregoing corresponding method embodiment. An implementation principle and a technical effect of the apparatus embodiment are similar to those of the foregoing method embodiment, and details are not described herein again.

Optionally, the uplink information is sent by the terminal device at a transmit power adjusted based on the second parameter and a first parameter, the first parameter is identified by using power control identification information determined by the terminal device, and the first parameter includes a path loss compensation factor and/or a signal-to-noise ratio that is used when a network device receives data from the terminal device.

Optionally, when the DCI is fallback DCI, the power control identification information is first power control identification information, and the first power control identification information is used to identify a first path loss compensation factor and/or a first signal-to-noise ratio that is used when the network device receives data from the terminal device; or when the DCI is non-fallback DCI, the power control identification information is second power control identification information, and the second power control identification information is used to identify a second path loss compensation factor and/or a second signal-to-noise ratio that is used when the network device receives data from the terminal device, where the first power control identification information is different from the second power control identification information.

Optionally, the first path loss compensation factor and the second path loss compensation factor are independently configured; or the first signal-to-noise ratio and the second signal-to-noise ratio are independently configured.

Optionally, when the DCI is the fallback DCI, the terminal device is in a non-radio resource control RRC connected mode or an RRC connected mode; or when the DCI is the non-fallback DCI, the terminal device is in an RRC connected mode.

The uplink information receiving apparatus provided in this embodiment of this application may execute the foregoing corresponding method embodiment. An implementation principle and a technical effect of the apparatus embodiment are similar to those of the foregoing method embodiment, and details are not described herein again.

It should be noted that, it should be understood that division of the units of the apparatus is merely logical function division, and in actual implementations, all or some of the units may be integrated into a physical entity, or the units may be physically separate. In addition, all of the units may be implemented in a form of software invoked by a processing element or in a form of hardware. Alternatively, some of the units may be implemented in a form of software invoked by a processing element, and some of the units may be implemented in a form of hardware. For example, the sending unit may be a processing element disposed independently, or may be integrated into a chip of the apparatus for implementation. In addition, the sending unit may alternatively be stored in a memory of the apparatus in a form of a program, and invoked by a processing element of the apparatus to perform the function of the sending unit. Implementations of other units are similar to the implementation of the sending unit. In addition, all or some of the units may be integrated together or may be independently implemented. The processing element may be an integrated circuit and has a signal processing capability. In an implementation process, the steps in the foregoing methods or the foregoing units can be implemented by using a hardware integrated logical circuit in the processing element, or by using instructions in a form of software. In addition, the sending unit is a unit that controls sending, and may send information by using a transmit apparatus, such as an antenna and a radio frequency apparatus, of the apparatus.

The foregoing units may be configured as one or more integrated circuits for performing the foregoing method, for example, one or more application-specific integrated circuits (ASIC), one or more microprocessors (DSP), or one or more field programmable gate arrays (FPGA). For another example, when one of the foregoing units is implemented in a form of a processing element invoking a program, the processing element may be a general-purpose processor, for example, a central processing unit (CPU) or another processor that can invoke a program. For another example, the units may be integrated together and implemented in a form of a system-on-a-chip (SOC).

Figure 10:
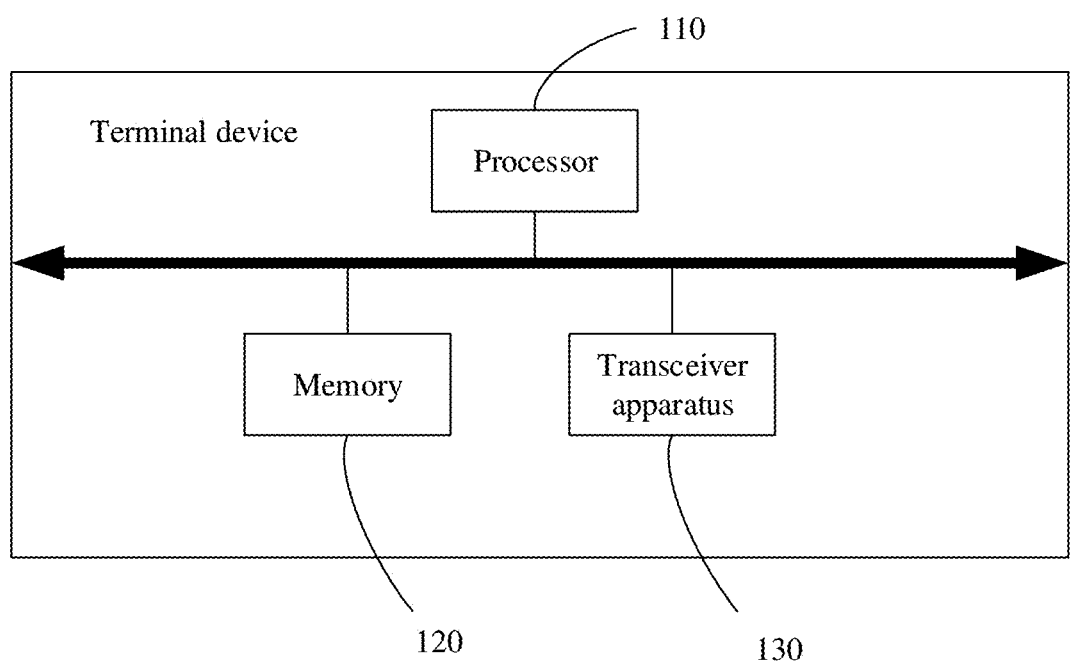
FIG. 10 is a schematic structural diagram of a terminal device according to an embodiment of this application.

FIG. 10 is a schematic structural diagram of a terminal device according to an embodiment of this application. As shown in FIG. 10, the terminal device includes a processor no, a memory 120, and a transceiver apparatus 130. The transceiver apparatus 130 may be connected to an antenna. In a downlink direction, the transceiver apparatus 130 receives, by using the antenna, information from a base station, and sends the information to the processor no for processing. In an uplink direction, the processor no processes data of the terminal device, and sends the processed data to the base station by using the transceiver apparatus 130.

The memory 120 is configured to store a program for implementing the foregoing method embodiment or the modules in the embodiment shown in FIG. 5, FIG. 6, or FIG. 7, and the processor no invokes the program to perform the operations in the foregoing method embodiment, or to implement the modules shown in FIG. 5, FIG. 6, or FIG. 7.

Alternatively, some or all of the foregoing modules may be implemented in a form of an integrated circuit that is embedded in a chip of the terminal device. In addition, the modules may be independently implemented, or may be integrated together. To be specific, the foregoing modules may be configured as one or more integrated circuits for performing the foregoing method, for example, one or more application-specific integrated circuits (ASIC), one or more microprocessors (DSP), or one or more field programmable gate arrays (FPGA).

Figure 11:
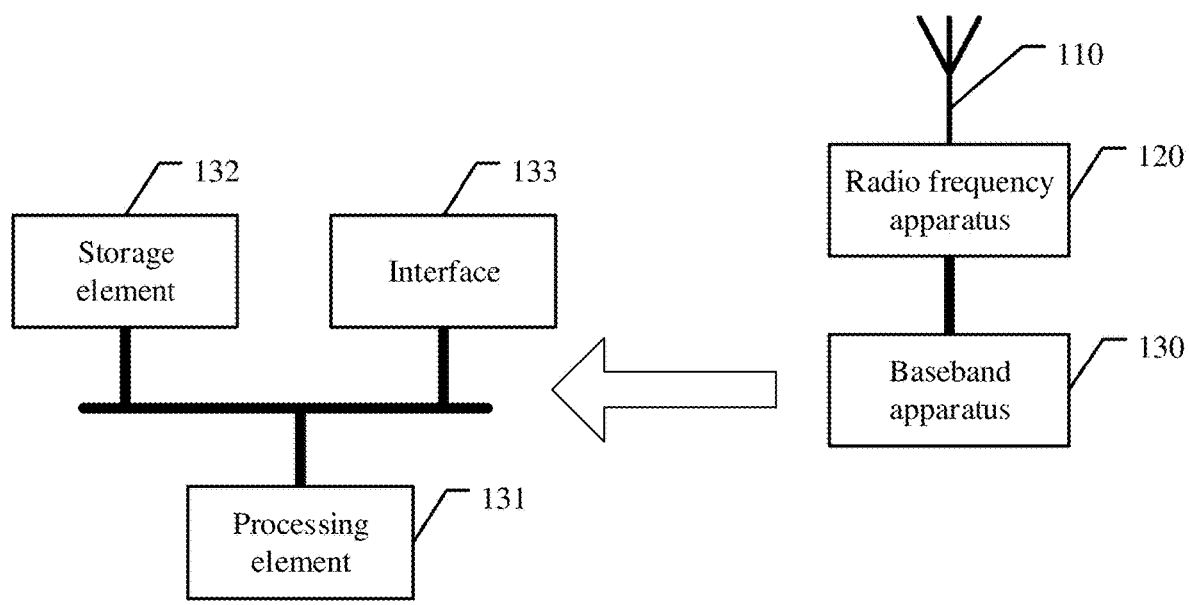
FIG. 11 is a schematic structural diagram of a base station according to an embodiment of this application.

FIG. 11 is a schematic structural diagram of a base station according to an embodiment of this application. As shown in FIG. 11, the base station includes an antenna 110, a radio frequency apparatus 120, and a baseband apparatus 130. The antenna no is connected to the radio frequency apparatus 120. In an uplink direction, the radio frequency apparatus 120 receives, by using the antenna 110, information from a terminal, and sends the information from the terminal, to the baseband apparatus 130 for processing. In a downlink direction, the baseband apparatus 130 processes the information of the terminal and sends the processed information to the radio frequency apparatus 120, and the radio frequency apparatus 120 processes the information of the terminal and then sends the processed information to the terminal by using the antenna 110.

In an implementation, the foregoing modules are implemented by a processing element by invoking a program. For example, the baseband apparatus 130 includes a processing element 131 and a storage element 132, where the processing element 131 invokes a program stored in the storage element 132, to perform the method in the foregoing method embodiment. In addition, the baseband apparatus 130 may further include an interface 133, configured to exchange information with the radio frequency apparatus 120. For example, the interface is a common public radio interface (CPRI).

In another implementation, the foregoing modules may be configured as one or more processing elements for implementing the foregoing method, and the processing elements are disposed on the baseband apparatus 130. The processing element herein may be an integrated circuit, for example, one or more ASICs, one or more DSPs, or one or more FPGAs. The integrated circuits may be integrated to form a chip.

For example, the foregoing modules may be integrated together and implemented in a form a system-on-a-chip (SOC). For example, the baseband apparatus 130 includes a SOC chip, configured to implement the foregoing method. The processing element 131 and the storage element 132 may be integrated in the chip, and the foregoing method or the functions of the foregoing units may be implemented by the processing element 131 by invoking the program stored in the storage element 132. Alternatively, at least one integrated circuit may be integrated in the chip to implement the foregoing method or the functions of the foregoing units. Alternatively, the foregoing implementations may be combined, to be specific, functions of some units are implemented by the processing element invoking a program, and functions of some units are implemented in a form of an integrated circuit.

Regardless of a used manner, the base station includes at least one processing element, a storage element, and a communications interface, and the at least one processing element is configured to perform the method provided in the foregoing method embodiment. The processing element may perform some or all of the steps in the foregoing method embodiment in a first manner, to be specific, by executing a program stored in the storage element, or in a second manner, to be specific, by using an integrated logic circuit of hardware in the processing element in combination with an instruction. Certainly, the method provided in the foregoing method embodiment may alternatively be performed by combining the first manner with the second manner.

As described above, the processing element herein may be a general-purpose processor, for example, a central processing unit (CPU), or may be one or more integrated circuits configured to implement the foregoing method, for example, one or more application-specific integrated circuits (ASIC), or one or more microprocessors (DSP), or one or more field programmable gate arrays (FPGA).

The storage element may be a memory, or a general name of a plurality of storage elements.

This application further provides a storage medium, including a readable storage medium and a computer program. The computer program is configured to implement the uplink information sending method according to any one of the foregoing embodiments.

This application further provides a program product. The program product includes a computer program (namely, an executable instruction), and the computer program is stored in a readable storage medium. At least one processor of a terminal device may read the computer program from the readable storage medium, and the at least one processor executes the computer program, so that the terminal device implements the uplink information transmission method according to the foregoing implementations.

An embodiment of this application further provides an uplink information sending apparatus, including at least one storage element and at least one processing element. The at least one storage element is configured to store a program. When the program is executed, the uplink information sending apparatus is enabled to perform an operation of the terminal device according to any one of the foregoing embodiments. The apparatus may be a terminal chip.

This application further provides a storage medium, including a readable storage medium and a computer program. The computer program is configured to implement the uplink information receiving method according to any one of the foregoing embodiments.

This application further provides a program product. The program product includes a computer program (namely, an executable instruction), and the computer program is stored in a readable storage medium. At least one processor of a base station may read the computer program from the readable storage medium, and the at least one processor executes the computer program, so that the base station implements the uplink information receiving method according to the foregoing implementations.

An embodiment of this application further provides an uplink information receiving apparatus, including at least one storage element and at least one processing element. The at least one storage element is configured to store a program. When the program is executed, the uplink information receiving apparatus is enabled to perform an operation of the base station according to any one of the foregoing embodiments. The apparatus may be a base station chip.

All or some of the steps of the method embodiments may be implemented by a program instructing relevant hardware. The foregoing program may be stored in a computer-readable memory. When the program is executed, the steps of the methods in the embodiments are performed. The memory (storage medium) includes a read-only memory (ROM), a RAM, a flash memory, a hard disk, a solid state disk, a magnetic tape, a floppy disk, an optical disc, and any combination thereof.

What is claimed is:

1. A method, comprising:
   determining, by a network device, a value of a first power control parameter in a first table of a plurality of tables that are stored by the network device, wherein each table of the plurality of tables comprises a plurality of sets of values of power control parameters, each set of values of the power control parameters in the first table comprises at least six values of a same corresponding power control parameter, in each table different sets of values of power control parameters of the plurality of sets of values of the power control parameters of the respective table correspond to different power control parameters, and in each table, each value of the power control parameters is stored in an association with a corresponding value of a transmit power control (TPC) command field;
   sending, by the network device, downlink control information (DCI) to a terminal device, wherein the DCI comprises a first field indicating which power control parameter of the different power control parameters is the first power control parameter and a first TPC command field comprising at least three bits, and a value of a combination of all bits of the at least three bits corresponds to the value of the first power control parameter in the first table stored by the network device; and
   receiving, by the network device, uplink information, wherein the uplink information is sent by the terminal device at a transmit power adjusted based on the value of the determined first power control parameter.

2. The method according to claim 1, wherein:
   the first power control parameter is an accumulated power correction parameter, an absolute power correction parameter, or a first parameter; and
   the first parameter is:
   a path loss compensation factor;
   a target signal-to-noise ratio to use when the network device receives data from the terminal device; or
   a power scaling factor; and
   the first table comprises a set of at least six values corresponding to the accumulated power correction parameter and a set of at least six values corresponding to the absolute power correction parameter.

3. The method according to claim 2, wherein the first power control parameter is the accumulated power correction parameter or the absolute power correction parameter, and the set of at least six values corresponding to the accumulated power correction parameter and the set of at least six values corresponding to the absolute power correction parameter are configured by the network device to the terminal device using higher layer signaling.

4. A method, comprising:
   receiving, by a terminal device, downlink control information (DCI) from a network device, wherein the DCI comprises a first field indicating which power control parameter of different power control parameters corresponding to a first table of a plurality of tables stored by the network device is a first power control parameter, and the DCI further comprises a first transmit power control (TPC) command field comprising at least three bits, and a value of a combination of all bits of the at least three bits corresponds to a value of the first power control parameter in the first table, each table of the plurality of tables comprises a plurality of sets of values of power control parameters, the value of the first power control parameter is determined by the network device from a set of values of the first power control parameter comprised in the first table, each set of values of the plurality of sets of values of the power control parameters in the plurality of tables comprises at least two values, and in each table, each value of the power control parameters is stored in an association with a corresponding value of the TPC command field, and wherein:
the first table comprises a first value corresponding to an adjustment of −2 dB and a second value corresponding to an adjustment of 5 dB, or
the first table comprises a first value corresponding to an adjustment of −7 dB and a second value corresponding to an adjustment of 7 dB, or
the first table comprises a first value corresponding to an adjustment of −2 dB and a second value corresponding to an adjustment of 6 dB, or
the first table comprises a first value corresponding to an adjustment of −8 dB and a second value corresponding to an adjustment of 8 dB;
adjusting, by the terminal device, a transmit power based on the value of the first power control parameter, to obtain an adjusted transmit power; and
sending, by the terminal device, uplink information at the adjusted transmit power.

5. The method according to claim 4, wherein:
the first power control parameter comprises an accumulated power correction parameter, an absolute power correction parameter, or a first parameter; and
the first parameter comprises:
a path loss compensation factor;
a target signal-to-noise ratio to use when the network device receives data from the terminal device; or
a power scaling factor.

6. The method according to claim 5, wherein the first power control parameter comprises the accumulated power correction parameter or the absolute power correction parameter, and a set of values of the accumulated power correction parameter and a set of values of the absolute power correction parameter are configured by the network device to the terminal device using higher layer signaling.

7. An apparatus, comprising:
a transceiver;
a non-transitory memory storage comprising instructions; and
one or more processors in communication with the non-transitory memory storage, wherein the instructions to are executable by the one or more processors to:
determine a value of a first power control parameter in a set of values of the first power control parameter of a first table of a plurality of tables, wherein the plurality of tables are stored in a memory of the apparatus, each table of the plurality of tables comprises a plurality of sets of values of power control parameters, each set of values of the power control parameters in each table comprises at least two values, each table of the plurality of tables comprises sets of values corresponding to different power control parameters, a first table of the plurality of tables comprises the set of values corresponding to the first power control parameter, and in each table, each value of the power control parameters is stored in an association with a corresponding value of a transmit power control (TPC) command field, and wherein:
the stored set of values of the first power control parameter comprises a first value corresponding to an adjustment of −2 dB and a second value corresponding to an adjustment of 5 dB, or
the stored set of values of the first power control parameter comprises a first value corresponding to an adjustment of −7 dB and a second value corresponding to an adjustment of 7 dB, or
the stored set of values of the first power control parameter comprises a first value corresponding to an adjustment of −2 dB and a second value corresponding to an adjustment of 6 dB, or
the stored set of values of the first power control parameter comprises a first value corresponding to an adjustment of from −8 dB and a second value corresponding to an adjustment of 8 dB;
send indication information to a terminal device, wherein the indication information indicates the determined value of the first power control parameter; and
receive uplink information, wherein the uplink information is sent by the terminal device at a transmit power adjusted based on the determined value of the first power control parameter.

8. The apparatus according to claim 7, wherein:
the first power control parameter comprises an accumulated power correction parameter, an absolute power correction parameter, or a first parameter; and
the first parameter comprises:
a path loss compensation factor;
a target signal-to-noise ratio to use when the apparatus receives data from the terminal device; or
a power scaling factor.

9. The apparatus according to claim 8, wherein the first power control parameter comprises the accumulated power correction parameter or the absolute power correction parameter, and a set of values of the accumulated power correction parameter or a set of values of the absolute power correction parameter is configured by the apparatus to the terminal device using higher layer signaling.

10. The apparatus according to claim 7, wherein the indication information is carried in downlink control information (DCI).

11. The apparatus according to claim 10, wherein the indication information is carried in a first field in the DCI, and the first field is a DCI header, a modulation and coding scheme (MCS), or a power control adjustment state variable of a physical uplink shared channel (PUSCH).

12. A apparatus, comprising:
a transceiver;
a non-transitory memory storage comprising instructions; and
one or more processors in communication with the non-transitory memory storage, wherein the instructions are executable by the one or more processors to:
receive downlink control information (DCI) from a network device, wherein the DCI comprises a first field indicating which power control parameter of different power control parameters corresponding to a plurality of sets of values of power control values in a first table of a plurality of tables stored by the network device is a first power control parameter, and the DCI further comprises a first transmit power control (TPC) command field comprising at least three bits, and a combination of all bits of the at least three bits corresponds to a value of the first power control parameter in the first table, the value of the first power control parameter is determined by the network device from a set of values of the first power control parameter comprised in the first table, and each set of values of the plurality of sets of values of power control parameters in the first table comprises at least six values of a same corresponding power control parameter, and in each table, each value of the power control parameters is stored in an association with a corresponding value of a transmit power control (TPC) command field;

adjust a transmit power based on the value of the first power control parameter, to obtain an adjusted transmit power; and send uplink information at the adjusted transmit power.

13. The apparatus according to claim 12, wherein:

the first power control parameter comprises an accumulated power correction parameter, an absolute power correction parameter, or a first parameter, and the first parameter comprises:

a path loss compensation factor;

a target signal-to-noise ratio to use when the network device receives data from the apparatus; or a power scaling factor.

14. The apparatus according to claim 13, wherein the first power control parameter comprises the accumulated power correction parameter or the absolute power correction parameter, and a set of values of the accumulated power correction parameter or a set of values of the absolute power correction parameter is configured from the network device to the apparatus using higher layer signaling.

15. The apparatus according to claim 12, wherein the plurality of sets of values of the power control parameters comprises a set of values of an accumulated power correction parameter and a set of values of an absolute power correction parameter.

16. The apparatus according to claim 15, wherein the set of values of the accumulated power correction parameter comprises a first value corresponding to an adjustment of −2 dB and a second value corresponding to an adjustment of 5 dB, and the set of values of the absolute power correction parameter comprises a third value corresponding to an adjustment of −7 dB and a fourth value corresponding to an adjustment of 7 dB.

17. The apparatus according to claim 15, wherein the set of values of the accumulated power correction parameter comprises a first value corresponding to an adjustment of −1 dB and a second value corresponding to an adjustment of 5 dB, and the set of values of the absolute power correction parameter comprises a third value corresponding to an adjustment of −6 dB and a fourth value corresponding to an adjustment of 6 dB.

18. The apparatus according to claim 15, wherein the set of values of the accumulated power correction parameter comprises a first value corresponding to an adjustment of −2 dB and a second value corresponding to an adjustment of 6 dB, and the set of values of the absolute power correction parameter comprises a third value corresponding to an adjustment of −8 dB and a fourth value corresponding to an adjustment of 8 dB.

* * * * *